(12) United States Patent
Thorning et al.

(10) Patent No.: US 9,895,850 B2
(45) Date of Patent: Feb. 20, 2018

(54) METHOD OF PRODUCING AN ASSEMBLY FOR USE IN A FIBRE REINFORCED STRUCTURAL ELEMENT

(71) Applicant: FIBERLINE A/S, Middelfart (DK)

(72) Inventors: Henrik Thorning, Kolding (DK); Lars Tilsted Lilleheden, Kolding (DK)

(73) Assignee: FIBERLINE A/S, Middlefart (DK)

( * ) Notice: Subject to any disclaimer, the term of this patent is extended or adjusted under 35 U.S.C. 154(b) by 308 days.

(21) Appl. No.: 14/412,375

(22) PCT Filed: Jul. 3, 2013

(86) PCT No.: PCT/EP2013/064011
§ 371 (c)(1),
(2) Date: Dec. 31, 2014

(87) PCT Pub. No.: WO2014/006080
PCT Pub. Date: Jan. 9, 2014

(65) Prior Publication Data
US 2015/0165700 A1    Jun. 18, 2015

(30) Foreign Application Priority Data
Jul. 3, 2012  (EP) ..................................... 12174815

(51) Int. Cl.
*B29C 70/52*    (2006.01)
*B29C 70/54*    (2006.01)
(Continued)

(52) U.S. Cl.
CPC ............ *B29C 70/52* (2013.01); *B29C 70/086* (2013.01); *B29C 70/088* (2013.01);
(Continued)

(58) Field of Classification Search
CPC ....................................................... B29C 70/52
See application file for complete search history.

(56) References Cited

U.S. PATENT DOCUMENTS 3,372,073 A    3/1968   Cutler
4,278,401 A    7/1981   Martinelli
(Continued)

FOREIGN PATENT DOCUMENTS

AT    1510694       6/2012
DE    19625426      1/1998
(Continued)

OTHER PUBLICATIONS

International Search Report on corresponding PCT application (PCT/EP2013/064011) from International Searching Authority (EPO) dated Nov. 27, 2013.

*Primary Examiner* — Larry Thrower
(74) *Attorney, Agent, or Firm* — Klein, O'Neill & Singh, LLP

(57) ABSTRACT

A method of producing an assembly for use in a structural element of a fiber-reinforced material includes providing a core element including an inner core and a circumferential cover, the core element having an end part; producing a subassembly by receiving and centering the end part of the core element into a conforming end recess of a bolt fixture; fixing the bolt fixture to the end part of the core element in the subassembly by circumferentially covering the subassembly with a casing formed of cured fiber-reinforced resin; and machining the subassembly circumferentially covered within the casing.

21 Claims, 12 Drawing Sheets

(51) Int. Cl.
*B29C 70/86* (2006.01)
*B29C 70/08* (2006.01)
*B29C 70/88* (2006.01)
*F16B 35/00* (2006.01)
*B29L 23/00* (2006.01)
*B29L 31/08* (2006.01)
*B29L 1/00* (2006.01)
*B29L 31/06* (2006.01)

(52) U.S. Cl.
CPC ............ *B29C 70/545* (2013.01); *B29C 70/86* (2013.01); *B29C 70/88* (2013.01); *F16B 35/00* (2013.01); *B29L 2001/00* (2013.01); *B29L 2023/00* (2013.01); *B29L 2031/06* (2013.01); *B29L 2031/085* (2013.01); *Y02E 10/721* (2013.01); *Y02P 70/523* (2015.11); *Y10T 29/49885* (2015.01); *Y10T 29/49963* (2015.01); *Y10T 29/49964* (2015.01); *Y10T 29/49966* (2015.01)

(56) References Cited

U.S. PATENT DOCUMENTS

| | | | |
|---|---|---|---|
| 4,339,230 | A | 7/1982 | Hill |
| 4,892,462 | A | 1/1990 | Barbier et al. |
| 5,236,018 | A | 8/1993 | Kobayashi et al. |
| 5,664,820 | A | 9/1997 | Carmien |
| 7,357,725 | B2 | 4/2008 | Sueoka et al. |

FOREIGN PATENT DOCUMENTS

| | | | |
|---|---|---|---|
| EP | 1467853 | | 3/2007 |
| EP | 0170886 | | 1/2010 |
| EP | 2266788 | | 12/2010 |
| FR | 2670956 | | 6/1992 |
| FR | 2758594 | | 7/1998 |
| GB | 2119472 | | 11/1983 |
| WO | WO03/057457 | | 7/2003 |
| WO | WO2003/057457 | * | 7/2003 |

* cited by examiner

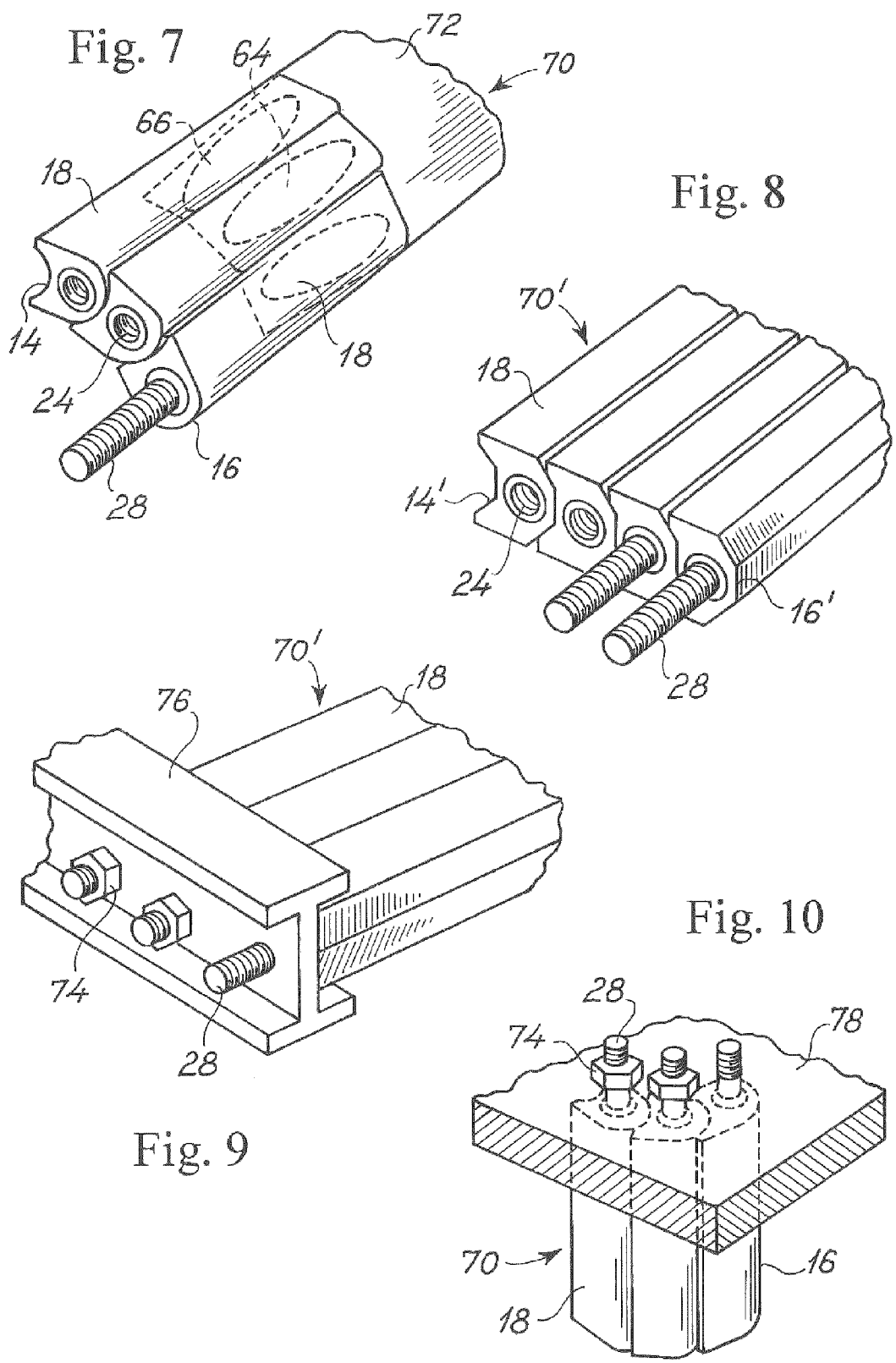

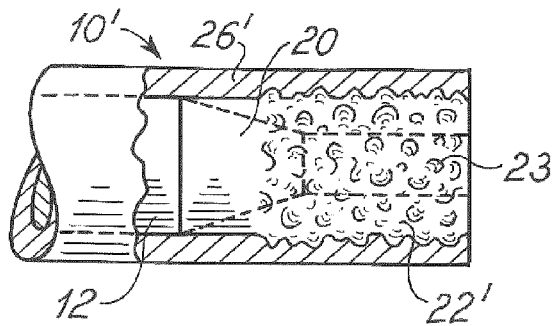
Fig. 11a
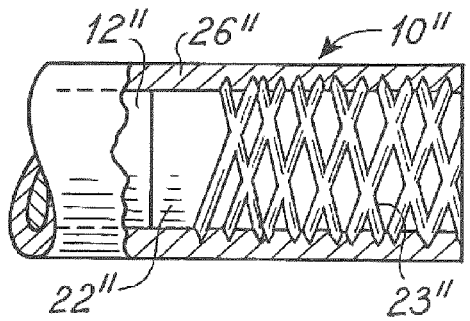
Fig. 11b
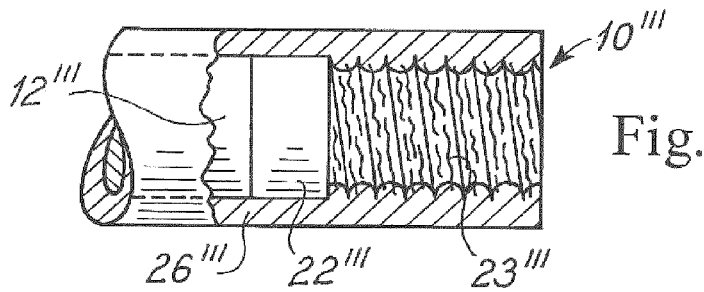
Fig. 11c
Fig. 12a
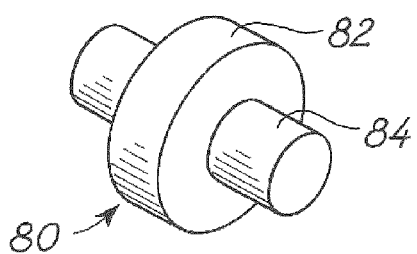
Fig. 12b
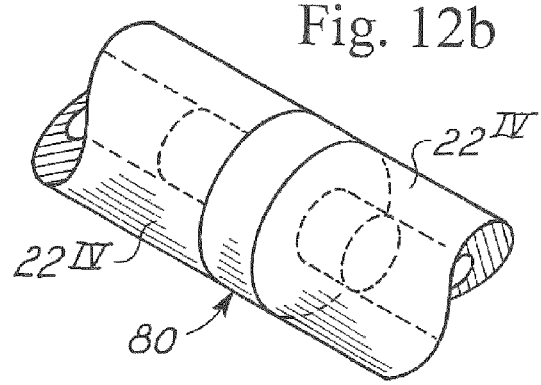
Fig. 14a
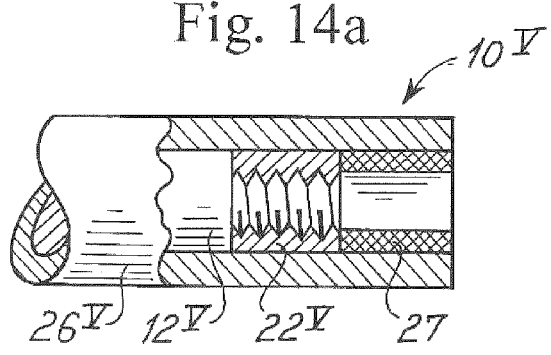
Fig. 14b
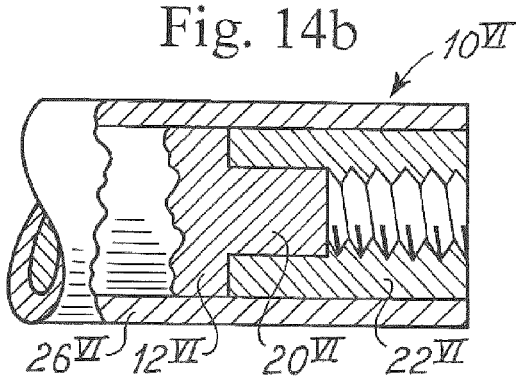

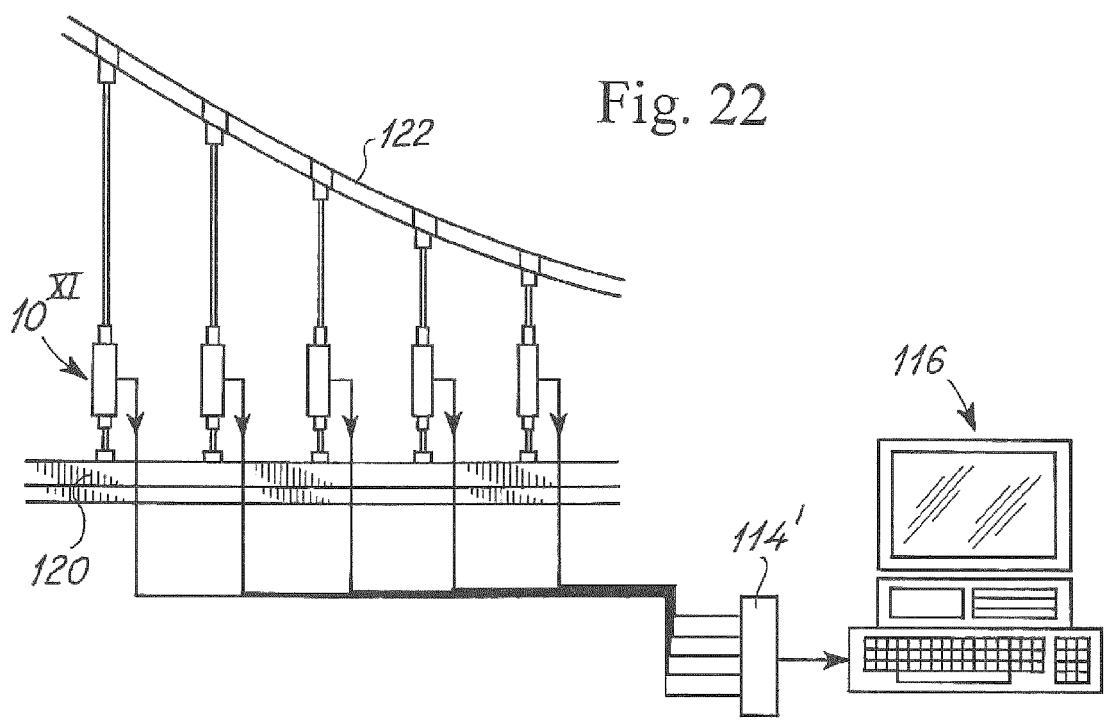
Fig. 22
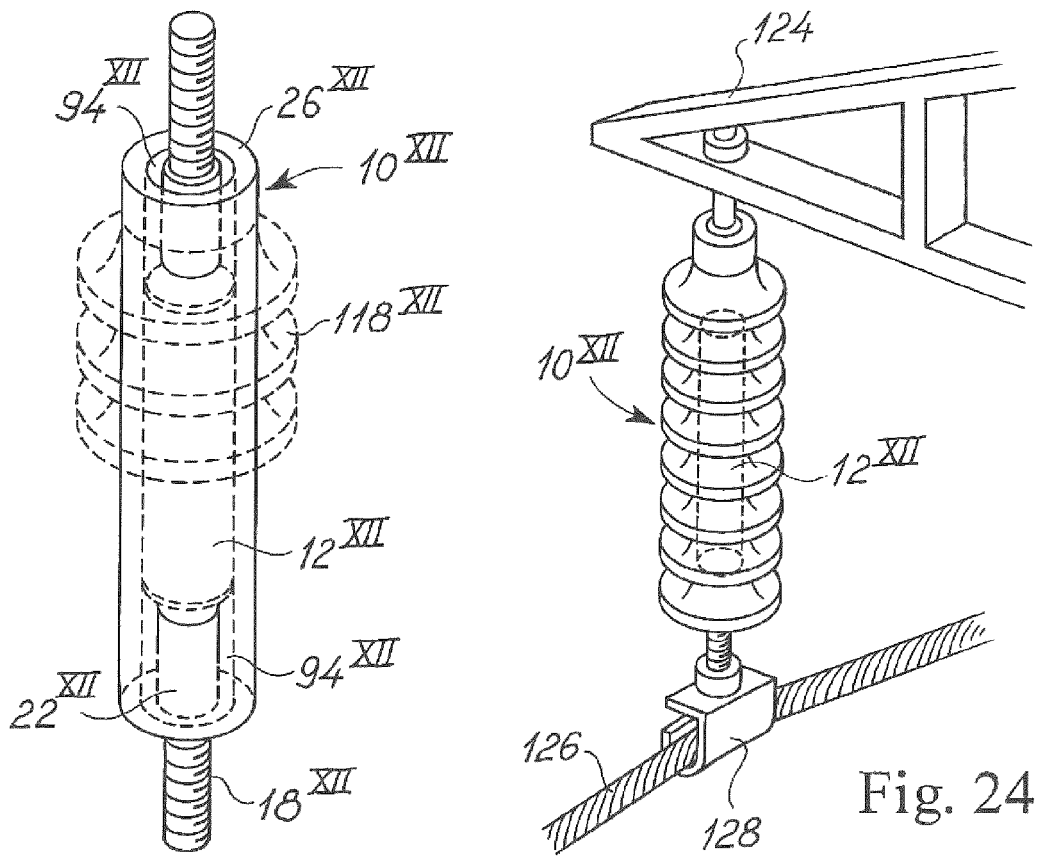
Fig. 23
Fig. 24

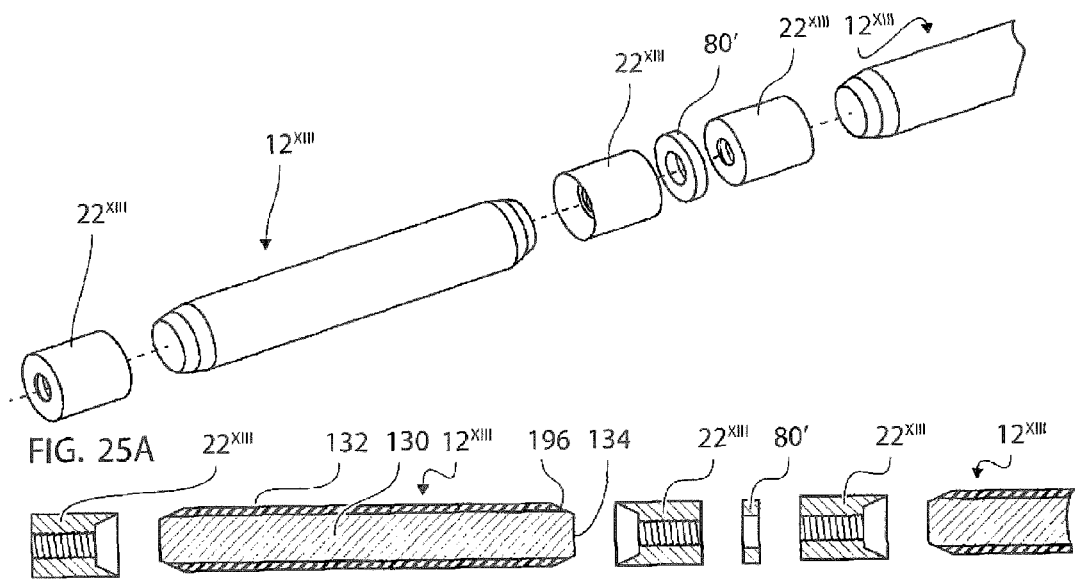
FIG. 25A
FIG. 25B
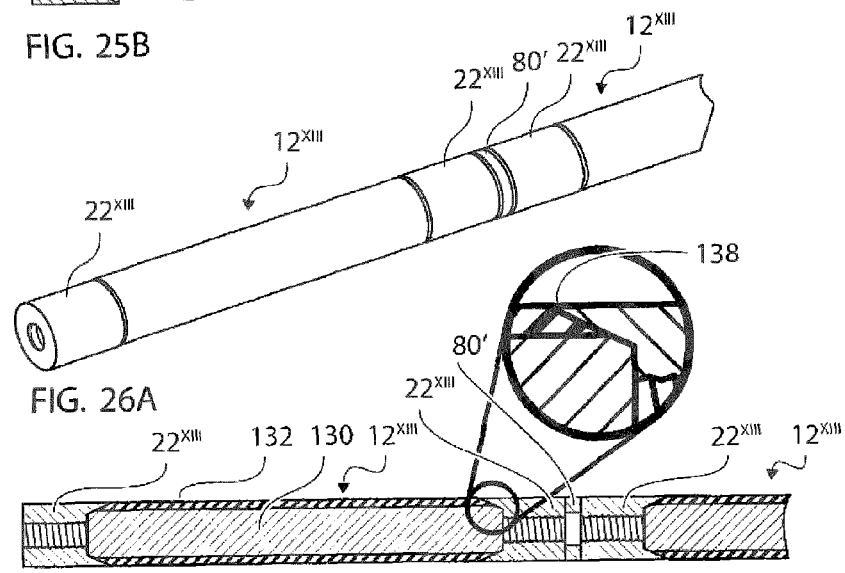
FIG. 26A
FIG. 26B
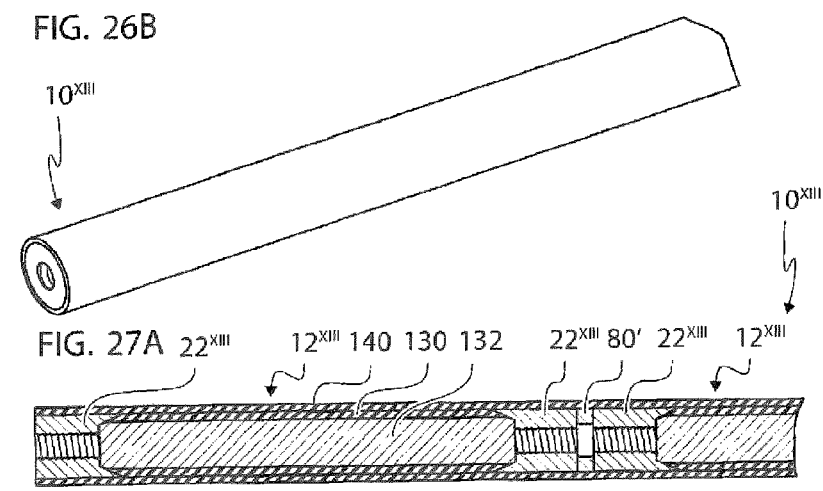
FIG. 27A
FIG. 27B

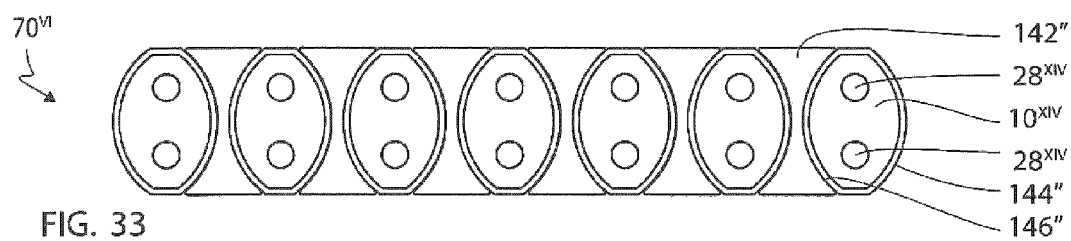
FIG. 33
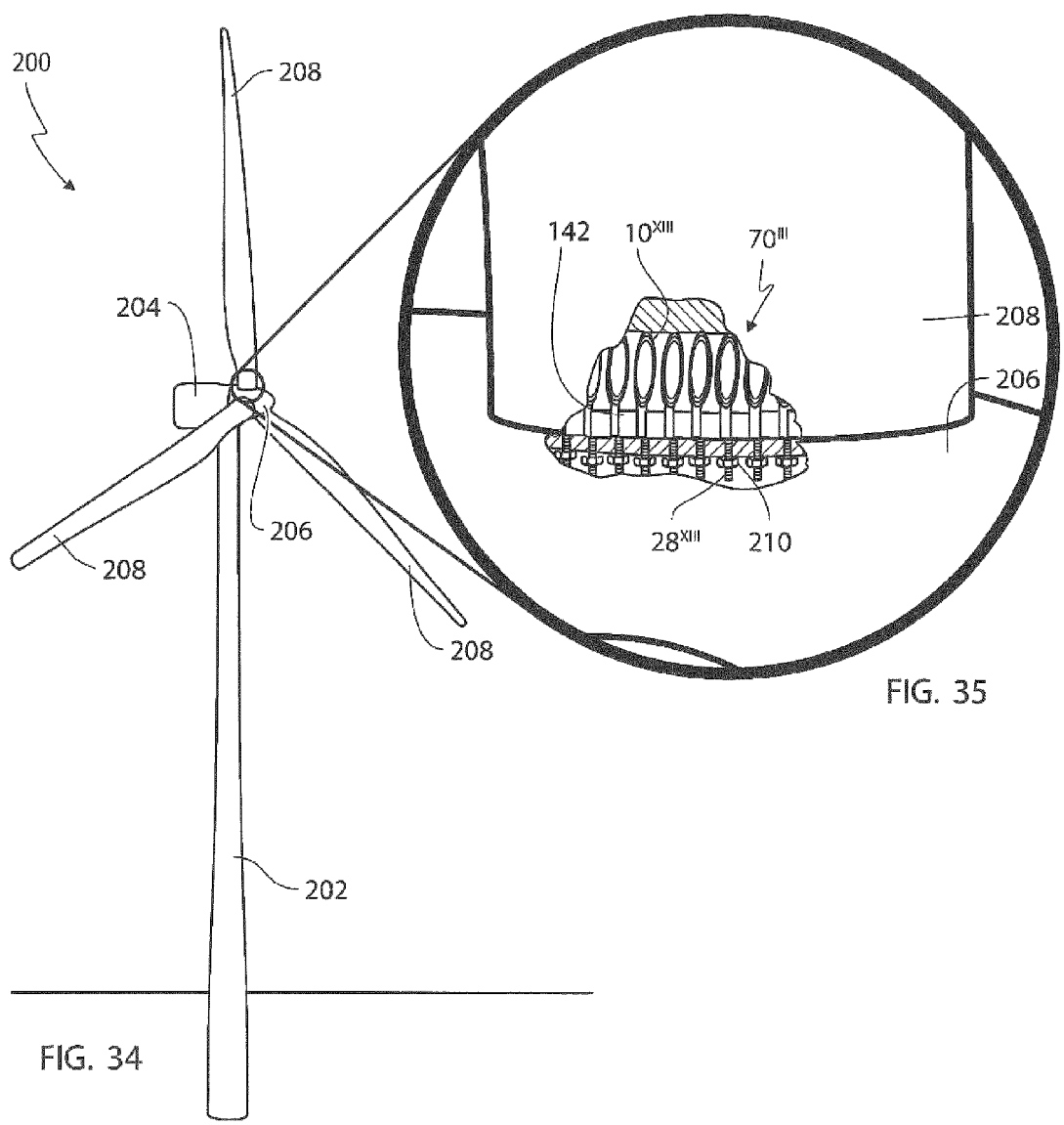
FIG. 34
FIG. 35

METHOD OF PRODUCING AN ASSEMBLY FOR USE IN A FIBRE REINFORCED STRUCTURAL ELEMENT

CROSS-REFERENCE TO RELATED APPLICATIONS

This application is the national phase entry, under 35 U.S.C. Section 371(c), of International Application No. PCT/EP2013/064011, filed Jul. 3, 2013, claiming priority from European Application No. 12174815.6, filed Jul. 3, 2012. The disclosures of the International Application and the European Application from which this application claims priority are incorporated herein by reference in their entireties.

FEDERALLY SPONSORED RESEARCH OR DEVELOPMENT

Not Applicable

BACKGROUND

The present invention relates generally to the technique of producing large fibre reinforced structural elements and in particular a technique of fixating bolt fixtures or bolts in the fibre reinforced structural element.

In the present context, the term a fibre reinforced structural element is construed as a generic term comprising any structural element made from resin or plastics based materials being fibre reinforced by means of fibres such as glass fibre, carbon fibre or kevlar fibre reinforced structural elements produced from a resin material such as polyester, vinyl ester, phenol, epoxy or polyurethane. Further the structural element may in itself constitute a load-carrying element or a supporting element such as an element of a building structure, a facade element, a bridge, a component of a wind mill, a component of a ship such as a deck component.

In the present context, the terms a bolt fixture, a bolt and a fitting are to be construed as generic terms comprising any elements such as a bolt, the shaft of the bolt, a nut, a hook, a pin with external thread, an arresting element e.g. a press fitting or snap fitting closure element etc. serving the purpose of co-operating with another fixating element e.g. a congruent or mating fixating element for the fixation of a structural element which supports the bolt fixture, bolt or fitting, or a fitting including an internal thread or a differently configured body including a protruding outer thread part or an inner thread for receiving the thread of a bolt.

Within the industry the use of fibre reinforced structural elements has increased rapidly within the last decades, basically inspired by the success of the use of such elements within the wind mill industry. Apart from wind mill components such as the blades of a wind mill, fibre reinforced structural elements have also gained success within the house-building industry and ship-building industry and even within certain technical fields in which metal structures have conventionally been used. As an example within the chemical industry or the galvanising- and zinc coating industry, conventional metal structures tend to have a fairly short life time due to the excessive corrosion impact whereas fibre reinforced structural elements including containers, stairs, supporting elements, etc. may stand the exposure to the corrosive atmosphere without being to any substantial extent deteriorated or ruined.

Examples of structural elements and techniques of fixating various components within structural elements are described in the below patent applications and patents to which reference is made and which US patents are hereby incorporated in the present application by reference. The references comprise: EP 0 170 886, EP 1 467 853, U.S. Pat. No. 4,892,462, U.S. Pat. No. 4,339,230, U.S. Pat. No. 4,278,401, FR 2 758 594, FR 2 670 956, U.S. Pat. No. 5,664,820, U.S. Pat. No. 3,372,073, U.S. Pat. No. 7,357,725, GB 2 119 472 and DE 196 25 426.

SUMMARY

It has been realised by the applicant company that the technique of embedding and fixating bolt fixtures, bolts and/or fittings within a fibre reinforced element may impose certain problems in particular as far as the proper and accurate location of the bolt fixtures, bolts or fittings are concerned. Whereas the conventional technique has involved the simple positioning of bolt fixtures, bolts or fixtures within the fibre reinforced structural element to be machined, extruded or pultruded in the production process, it has been realised by the applicant company that this conventional and simple technique does not allow the bolt fixtures, bolts or fittings to be positioned with the necessary accuracy needed within the industry and being a mandatory provision for the further commercial exploitation of the fibre reinforcing technique for the manufacture of structural elements.

An object of the present invention is to provide a novel technique allowing a simple and accurate positioning of bolts, bolt fixtures or fittings within a fibre reinforced structural element at predetermined positions or locations and with an accuracy acceptable within the industry including the house-building, ship-building and wind mill industry such as an accuracy of +/−1 mm variation of the location of a specific bolt, bolt fixture or fitting or even a lower variation such as a variation of +/−0.5 mm.

It is a feature of the present invention that the novel technique according to the present invention provides an improved transmission of force and impact to and from the fibre reinforced structural element through the bolt fixtures, bolts or fittings thereby allowing a reduction of the size of the fibre reinforced structure i.e. providing a reduction of the weight of the fibre reinforced structure or in the alternative a reduction of the materials used for the fibre reinforce structural element.

It is a further feature of the present invention that the method and technique according to the present invention allows bolt fixtures, bolts or fittings to be located at specific locations and fixated within a fibre reinforced structural element in solid and high-load-bearing casing.

It is a particular advantage of the present invention that the novel technique of positioning and fixating bolt fixtures, bolts or fittings within a fibre reinforced structural element allows the use of high-load-bearing casings for the positioning of the bolt fixtures, bolts or fittings and to provide an easy positioning of the bolt fixtures, bolts or fittings in specific geometrical configuration or shape generated by particularly configuring the load-bearing casing supporting the bolt fixtures, bolts or fixtures.

In connection with known bolt fixture assemblies and bolt assemblies comprising a core, a bolt or bolt fixture attached to the core and a casing of fibre reinforced material covering the core and the bolt or bolt fixture, it has been noted by the applicant company that very high stresses occur at the outermost radial interface between the core and the bolt or bolt fixture. It is therefore a further object of the present invention to provide a novel technique for producing a fibre reinforced bolt fixture assembly which is having an increased structural strength at the location of the highest stresses.

Further, the applicant company is a producer of bolt fixture assemblies or bolt assemblies for a myriad of applications in a number of different industries, some of which have been mentioned above. Frequently, each different application requires numerous bolt fixture assemblies forming a fixation assembly having a distinct shape in order to fit a specific profile of the fibre reinforced structural element which is going to receive the bolt fixture, e.g. a wing of a wind power plant would possibly require a fixation assembly having an aerofoil shape. Such non-standard shapes require frequent exchange of extruder heads etc which is very costly. It is therefore yet a further object of the present invention to provide a novel technique for allowing specific non-standard fixation assemblies to be constructed by using a plurality of standard assemblies.

The above object, the above features and the above advantage together with numerous other objects, advantages and features which will be evident from the below detailed description of the present invention are according to a first aspect of the present invention obtained by a method of producing an assembly for use in a fibre reinforced structural element, the method comprising the steps of:

i) providing an elongated core element, the elongated core element including an inner core of a first material, and, a cover circumferentially encircling the inner core and being made of a second material being a fibre reinforced material compatible with the materials of the fibre reinforced structural element, the elongated core element having an end part, the end part having a conical or partially conical shape, such as a truncated conical shape, the end part defining a central end face exposing the inner core and a circumferential end face encircling the central end face and exposing the cover, ii) providing a bolt fixture or bolt comprising an end recess having a conical or partially conical shape, such as a truncated conical shape, the end recess being congruent with the end part of the elongated core element, iii) producing a subassembly by receiving and centring the end part of the core element in relation to the end recess of the bolt fixture or bolt, iv) fixating the bolt fixture or bolt to the end part of the core element in a pultrusion process by pulling the subassembly through a pultruder, by circumferentially covering the subassembly with reinforcing fibres and resin and by heating and curing the resin for causing the resin to provide in conjunction with the reinforcing fibres a casing circumferentially encircling the subassembly, or alternatively fixating the subassembly by adhesion to the casing produced in a separate pultrusion process, and v) machining the subassembly circumferentially encircled within the casing of the reinforcing fibres and the cured resin for providing the assembly including the elongated core element and the bolt fixture or bolt.

The assembly may be a bolt fixture assembly or a bolt assembly and is typically used for connecting a fibre reinforced structural element to another structural element, e.g. a fibre reinforced wing to the hub of a wind power plant. According to the basic teachings of the present invention, the elongated core element comprises an inner core, preferably made up of soft and light materials, which is pre-positioned within a cover made up of a fibre reinforced material, preferably made in a pultrusion process. The individual bolt fixture or bolt is being positioned in a casing within a bolt fixture assembly or bolt assembly. The assembly itself is composed of the elongated core element which is accurately positioned relative to the bolt fixture or bolt and in a separate production process step fixated to the bolt fixture or bolt in a pultrusion process. Alternatively, the casing may be a separate part which is adhered to the elongated core element and bolt or bolt fixture in a separate process. The casing and cover are preferably both made up of the same second material being a fibre reinforced material. As will be described in greater details below, the use of the pultrusion process for the production of the bolt fixture, bolt or fitting assembly allows the bolt fixture, bolt or fitting assembly to be manufactured in a specific metrical configuration promoting or ensuring the intentional positioning of the individual bolt fixtures, bolts or fittings within the final fibre reinforced structural element. The production of the bolt fixture, bolt or fitting assembly also ensures the necessary load-bearing capability of the individual bolt fixture, bolt or fitting due to the pultrusion process used for the fixation of the bolt fixture, bolt or fitting relative to the core element within the individual bolt fixture, bolt or fitting assembly. Further, the assembly is typically moulded into a corresponding cavity of the fibre reinforced element, preferably using compatible resins in order to achieve a compatible and thereby strong bonding between the assembly and the fibre reinforced element.

The inner core element may be prefabricated e.g. through casting, machining, etc. from a material which is compatible with the materials of the fibre reinforced structural element meaning that the materials used for the inner core element and the fibres and resins used for the pultrusion process for the encasing of the subassembly are mechanically, structurally and chemically combinable with the materials of the fibre reinforced structural element. The bolt fixture assembly or bolt assembly should be manufactured from materials compatible with the casing and inner core and in addition exhibiting improved strengths and load-bearing capability. Advantageously, the same materials may be used for the production of the bolt fixture assembly or bolt assembly and for the remaining part of the fibre reinforced structural element.

Provided a non-pre-cast inner core element is used, the method according to the present invention preferably comprises the step of providing a continuous elongated inner core element body. The cover may then preferably be applied in a separate pultrusion process and the elongated core element resulting thereby may be cut into an appropriate length and machined such that it exhibits the conical end part. The length of the elongated core element should be sufficient for allowing a large contact and bonding surface with the structural element.

Since the load-bearing properties of the elongated core element is provided for the most part in the cover, the conical shape of the end part of the elongated core element may be partially conical, such as truncated conical. The central end face may thus be substantially flat. Consequently, the inner surface of the end recess of the bolt fixture or bolt should contact the circumferential end face of the end part such that any bending forces applied to the subassembly will be absorbed by the cover and not the inner core. It is understood that the circumferential end face also constitutes and end face of the cover. The outermost radial interface between the elongated core and the bolt or bolt fixture, which is the location of the highest stress, is thus located at the circumferential end face thus allowing the cover to absorb the high stress applied to the outermost radial interface.

The technique of centring and mounting the one bolt fixture or bolt on the one end part of the elongated core element may be easily accomplished provided the elongated core element is configured including the conical end part such as a fitting configured for the reception of the bolt fixture or bolt. In this context it is to be understood that the terms bolt fixture and bolt are used as genetic terms including elements such as the shaft of the bolt itself, a fitting including an internal thread or a differently configured body including a protruding outer thread part or an inner thread for receiving the thread of a bolt. The bolt fixture or bolt has a conical recess which corresponds to or matches the conical end part of the elongated core such that the bolt fixture of bolt may be centred and received in a stable and secure way at the conical end part.

The subassembly, which is understood to encompass the elongated core and the bolt or bolt fixture, is led through a pultrusion process as discussed above in order to permanently fix the elongated core and the bolt or bolt fixture.

According to a further embodiment of the first aspect, the end part defines an axial distance and a radial distance, the axial distance being smaller than the radial distance. By using an end part defining the axial distance being larger than the radial distance, the conical end part will assume a flattened shape, e.g. by using a partially conical shape such as a truncated conical shape. In this way the inner core will be less exposed compared to using a large axial distance which will allow a very sharp angle at the outermost axial location of the core which will however be very brittle.

According to a further embodiment of the first aspect, the first material is softer and/or lighter than the second material, the first material preferably being balsa wood or foamed polymer material such as foamed PU (polyurethane), foamed PVC (polyvinylchloride) or foamed PE (polyethylene). In order to reduce the weight of the assembly, the first material of the inner core should preferably be light. Since the structural strength of the assembly, i.e. in particular the transfer of load forces between the bolt or bolt fixture and the structural element, is carried by the cover and casing, the second material may be soft as well. A typical material fulfilling the above and in addition being compatible with many fibres and resins is balsa wood.

The above object, the above features and the above advantage together with numerous other objects, advantages and features which will be evident from the below detailed description of the present invention are according to a second aspect of the present invention obtained by a method of producing a fixation assembly for use in a fibre reinforced structural element, the method comprising the steps of:

i) providing an elongated core element of a material being compatible with the materials of the fibre reinforced structural element, preferably a fibre reinforced material, more preferably made through pultrusion, the core element having an end part for the mounting and fixation of a bolt fixture or a bolt, ii) providing a bolt fixture or a bolt for the fixation of the structural element to another structural element, iii) producing a subassembly by mounting the bolt fixture or bolt on the end part of the core element, iv) fixing the bolt fixture or bolt to the end part of the core element in a pultrusion process by pulling the subassembly through a pultruder, by circumferentially covering the subassembly with reinforcing fibres and resin and by heating and curing the resin for causing the resin to provide in conjunction with the reinforcing fibres a casing circumferentially encircling the subassembly, or alternatively fixating the subassembly by adhesion to the casing produced in a separate pultrusion process, v) producing a first assembly including the core element and the bolt fixture or bolt by machining the subassembly circumferentially encircled within the casing of the reinforcing fibres and the cured resin, the first assembly defining a first convex surface along the longitudinal axis of the first assembly, vi) repeating the steps i-v for producing a second assembly defining a second convex surface along the longitudinal axis of the second assembly, vii) producing a spacer of a material compatible with the materials of the fibre reinforced structural element, preferably a solid material, more preferably fibre reinforcement material, most preferably made through pultrusion, the spacer having a first concave surface corresponding to the first convex surface of the first assembly and a second concave surface corresponding to the second convex surface of the second assembly, and viii) producing a fixation assembly by positioning and preferably adhering the spacer between the first assembly and the second assembly such that the first concave surface contacting and preferably adhering to the first convex surface and the second concave surface contacting and preferably adhering to the second convex surface.

The method of producing the fixation assembly according to the second aspect involves producing at least two assemblies. Each assembly may preferably be manufactured by using the method according to the first aspect, however, alternatively, unitary core made entirely of fibre reinforced material or a softer and lighter material may be used as well. The technique of centring and mounting the one bolt fixture or bolt on the one end part of the elongated core element may be easily accomplished as described above in relation to the first aspect.

The first assembly is preferably made having a standardised shape including at least one convex surface, preferably extending in the entire axial direction of the assembly and a part of the circumferential distance of the assembly. Preferably, the first and second assemblies include only convex surfaces, such as a circular cylindrical shape or any similar shape of the assembly such as shapes having a cross-section of a circle, an ellipse, a square, a polygon or combinations thereof. Preferably, any concave surfaces on the assembly are avoided. Concave surfaces typically involve protruding edges which are less durable and more prone to break than convex or rounded surfaces and thus should the concave surfaces be avoided for the load-bearing parts of the fixation assembly, i.e. the first and second assemblies.

Such assemblies as described above (first and second assemblies) may preferably be made in a continuous process as described in connection with the first aspect. Thereby a large number of assemblies may be produced. The second assembly may thus be produced in the same continuous process as the first assembly.

The spacer may be made of any rigid material which is capable of filling the space in-between two assemblies (first and second assemblies). Thus, the spacer will be having respective concave surfaces congruent with the convex surfaces of the assemblies. Preferably, a strong and light material is used such as a plastic material or a fibre reinforced material. The concave surfaces of the spacer should correspond to the respective convex surfaces of the first and second assemblies, i.e. the concave and convex surfaces should match at least along a significant portion in the circumferential and longitudinal directions. The spacer does not include any bolt or bolt fixture and may thus be made very rigid. Further, as the spacer is non-load-bearing, it is unlikely that it is subjected to excessive load forces comparable to the forces subjected to the load-bearing first and second assemblies. Yet further, even in case the spacer would suffer limited stress related damage, it will not be critical, since the spacer is not load-bearing as such.

By varying the shape of the spacer it will be possible to produce the fixation assembly having a shape that is entirely occasional. By combining several assemblies having the same shape and spacers having differing shapes the shape of the final fixation assembly may be chosen arbitrarily, e.g. to correspond to the airfoil shape of a wing of a wind power plant.

It is further contemplated that the end part may be machined into a conical or partially conical shape, such as a truncated conical shape, for the receiving and centring of the bolt fixture or bolt having an end recess having a conical or partially conical shape, such as a truncated conical shape, being congruent with the end part.

In the present context, the expression "bolt fixture" should be understood to comprise a fitting including a bore or a threaded shaft. Alternatively, it may comprise a plurality of bores and a plurality of threaded shafts. The bolt fixture is preferably made of steel or any other extremely rigid material.

According to a further embodiment of the second aspect, the convex and concave surfaces define a circular arc. By defining the convex and concave surfaces as a circular arc in the transversal direction, the bolt fixture assembly and the spacer may have a common centre of rotation which allow the contact surface between the bolt fixture and the spacer to shift in order for the user to be able to define different angles between the spacer and the bolt fixture assembly.

According to a further embodiment of the second aspect, the method may further comprise repeating the steps i-v for producing a third assembly defining a third convex surface along the longitudinal axis of the third assembly, the spacer having a third concave surface corresponding to the third convex surface of the first assembly, the step viii) comprising contacting and preferably adhering the third concave surface to the third convex surface, thereby providing the first, second and third assemblies in a triangular configuration within the fixation assembly.

The fixation assembly is not limited to a "2D" structure. In fact, as stated above, by using the spacer having an arbitrary shape, the shape of the fixation assembly will be occasional. Preferably, in case a layered "3D" structure or box structure is desired, a spacer having three concave surfaces is contemplated. Yet more complex spacers are possible, having four, five, six or more surfaces.

The above object, the above features and the above advantage together with numerous other objects, advantages and features which will be evident from the below detailed description of the present invention are according to a third aspect of the present invention obtained by a method of producing a fibre reinforced structural element including a plurality of bolt fixtures or bolts for the fixation of the fibre reinforced structural element to another structural element, the method comprising the steps of producing the fixation assembly according to the second aspect and further the steps of:

ix) positioning the fixation assembly according to the intentional position of the fixation assembly within the final structural element, and x) producing the fibre reinforced structural element including the fixation assembly in an extrusion, a pultrusion or a fibre reinforcing production technique.

The fixation assembly is typically bonded to the fibre reinforced structural element by a fibre reinforcing technique such as moulding. By using the same or at least mutually compatible polymeric material (resins or plastics) for the fibre reinforced structural element as for the fixation assembly, a very strong bonding may be achieved.

According to a further embodiment of any of the previous aspects, the step i) of providing the elongated core element comprising the step of cutting the elongated core element from a continuous, elongated core element body, the continuous, elongated core element body preferably having a circular cross-sectional configuration.

As stated above, the elongated core element may be cut from a continuous, elongated core element body preferably having a circular cross sectional configuration in order to achieve strong and robust assemblies.

According to a further embodiment of any of the previous aspects, the elongated core element having respective end parts for receiving a respective bolt fixture or bolt at the respective end parts, the steps ii) to iv) comprising mounting and fixating two bolt fixtures or bolts at the respective end parts of the core element of the subassembly, and the step v) comprising machining the subassembly circumferentially encircled within the casing of the reinforcing fibres and the cured resin into two halves each constituting an assembly.

It is contemplated that a continuous process is used in which a plurality of such bolt fixture assemblies are pultruded after each other and subsequently cut into elements of two bolt fixtures or bolts as defined above. Preferably a small block is interposed between the bolt fixtures or bolts corresponding to the width of the cut, in order to avoid damage to the bolt fixture or bolt.

According to a further embodiment of any of the previous aspects, the casing being produced in step iv) having a circular, square, polygonal or an elliptical cross-sectional configuration, preferably a circular cross-sectional configuration.

A circular cross section will be most typical, since it enables a very simple extrusion head as well as an end product having a superior rigidity. Alternatively, an elliptical cross section or otherwise eccentric cross section may be used, e.g. in order to include additional bolts or bolt fixtures, i.e. bores or threaded rods, in the same assembly.

According to a further embodiment of any of the previous aspects, the step v) further comprising the step of machining the casing into a circular or an elliptical cross-sectional configuration, preferably a circular cross-sectional configuration.

The circular or elliptical cross section may also be achieved by machining the casing in a separate step after the casing has been produced.

According to a further embodiment of any of the previous aspects, the step v) comprising the step of machining the assembly such that an end surface part opposite the bolt fixture or bolt defines an acute angle relative to the longitudinal axis of the assembly.

In case the end surface part opposite the bolt or bolt fixture defines an acute angle relative to the longitudinal axis instead of being flat, i.e. parallel to the longitudinal axis, the total surface area of the assembly will be increased. This will provide an improved bonding between the fixation assembly and the structural element.

According to a further embodiment of any of the previous aspects, the bolt fixture or bolt has a corrugated outer surface.

By using a corrugated outer surface of the bolt of bolt fixture, the fixation between the bolt fixture or bolt and the casing will be improved in the longitudinal direction compared to a completely smooth outer surface.

The above object, the above features and the above advantage together with numerous other objects, advantages and features which will be evident from the below detailed description of the present invention are according to a fourth aspect of the present invention obtained by a fixation assembly for use in a fibre reinforced structural element, the fixation assembly comprising:

a first assembly and a second assembly, each of the first and second assemblies including an elongated core element having an end part and being made of a material being compatible with the materials of the fibre reinforced structural element, preferably fibre reinforcement material, more preferably made through pultrusion, and, a bolt fixture or bolt for the fixation of the structural element to another structural element, the bolt fixture or bolt being mounted and fixated to the end part of the core element, the elongated core and the bolt fixture or bolt being covered and circumferentially encircled with a casing of reinforcing fibres and cured resin, the first assembly and the second assembly defining a first convex surface and a second convex surface, respectively, along the longitudinal axis of the respective first and second assembly, and a spacer of a material being compatible with the materials of the fibre reinforced structural element, preferably a solid material, more preferably fibre reinforcement material, most preferably made through pultrusion, the spacer having a first concave surface corresponding to the first convex surface of the first assembly and a second concave surface corresponding to the second convex surface of the second assembly, the spacer being positioned and preferably adhered between the first bolt fixture assembly and the second bolt fixture assembly such that the first concave surface contacting and preferably adhering to the first convex surface and the second concave surface contacting and preferably adhering to the second convex surface.

The fixation assembly according to the fourth aspect is preferably manufactured using the method according to the second aspect.

The above object, the above features and the above advantage together with numerous other objects, advantages and features which will be evident from the below detailed description of the present invention are according to a fifth aspect of the present invention obtained by a fibre reinforced structural element produced in an extrusion, a pultrusion or a fibre reinforcing production technique, the fibre reinforced structural element comprising a fixation assembly according to the fourth aspect positioned within the structural element.

The fixation assembly according to the fifth aspect is preferably manufactured using the method according to the third aspect.

The above object, the above features and the above advantage together with numerous other objects, advantages and features which will be evident from the below detailed description of the present invention are according to a sixth aspect of the present invention obtained by an assembly for use in a fibre reinforced structural element, the assembly comprising:

an elongated core element including an inner core of an first material, and, a cover circumferentially encircling the inner core and being made of an second material being a fibre reinforced material compatible with the materials of the fibre reinforced structural element, the elongated core element having an end part, the end part having a conical or partially conical shape, such as a truncated conical shape, the end part defining a central end face at which the inner core is exposed and a circumferential end face encircling the central end face and exposing the cover, and a bolt fixture or a bolt for the fixation of the structural element to another structural element, the bolt fixture or bolt comprising an end recess having a conical or partially conical shape, such as a truncated conical shape, and being congruent with the end part of the elongated core element, the end part of the core element being received in and centred in relation to the end recess of the bolt fixture or bolt, the elongated core and the bolt fixture or bolt being covered and circumferentially encircled with a casing of reinforcing fibres and cured resin.

The fixation assembly according to the sixth aspect is preferably manufactured using the method according to the first aspect.

BRIEF DESCRIPTION OF THE DRAWINGS

The present invention is now to be further described with reference to the drawings, in which

FIG. 7 is a schematic view illustrating the intentional application of the bolt fixture assembly shown in FIGS. 5 and 6 for the production of a major fibre reinforced structure such as a wind mill element, a bridge part, a building element, the bolt fixtures being positioned along the arc of a circle, FIG. 8 is a perspective and schematic view similar to the view of FIG. 7 illustrating a slightly modified embodiment of the bolt fixture assembly used for the production of a fibre reinforced element in which the bolt fixtures are positioned along a rectilinear track, FIG. 9 is a perspective and schematic view of a segment of a structural element produced from the assembly shown in FIG. 8 illustrating the fixture of the fibre reinforced structural element to an I-beam by means of bolts and knots, FIG. 10 is a perspective and schematic view illustrating the fixation of the fibre reinforced structural element produced from the assembly shown in FIG. 7 having the bolt fixtures positioned along the arch of a circle, FIGS. 11a, 11b and 11c are perspective, schematic and partly sectional views illustrating three alternative embodiments of improving the fixation of the bolt fixtures in the pultrusion process, FIGS. 12a and 12b are perspective and schematic views illustrating a distance element and the use of a distance element in the pultrusion process, FIGS. 14a and 14b are schematic, perspective and partly sectional views illustrating differently configured bolt fixtures fixated within the pultrusion end casing, FIG. 22 is a schematic view illustrating a different application of the load-carrying assembly illustrated in FIG. 19 within a bridge, and including a parallel link to a PC-based measuring station, FIG. 23 is a perspective, schematic and partly sectional view of a further embodiment of the assembly according to the present invention configured as an insulator for a high voltage cable, FIG. 24 is a perspective and schematic view illustrating the intentional application of the insulator shown in FIG. 23, FIG. 25A is a perspective view similar to the view of FIG. 3 illustrating the components of a further embodiment of a sub-assembly of the presently preferred embodiment of the bolt fixture assembly or bolt assembly according to the present invention, FIG. 25B is a vertical sectional view of the sub-assembly shown in FIG. 25A, FIG. 26A is a perspective view similar to the view of FIG. 25A illustrating the sub-assembly of FIGS. 25A and 25B in a state of having the components joined together, FIG. 26B is a vertical sectional view similar to the view of FIG. 25B of the sub-assembly shown in FIG. 26A, FIG. 27A is a perspective view similar to the views of FIG. 25A and FIG. 26A of the presently preferred embodiment of the bolt fixture assembly or bolt assembly according to the present invention, FIG. 27B is a vertical sectional view of the bolt fixture assembly or bolt assembly shown in FIG. 27A

FIG. 33 is a top view of a fixation assembly including a plurality of elliptical bolt fixture assemblies and concave spacers.

FIG. 34 is a perspective view of a wind power plant.

FIG. 35 is perspective view of the hub and wing interface of the wind power plant of FIG. 34.

DETAILED DESCRIPTION

The present invention constitutes an improvement and a refinement of the technique described in EP 1 467 853 and U.S. Pat. No. 7,357,725 to which reference is made.

According to the method of producing an assembly including a bolt fixture of bolt for use in a fibre reinforced structural element, a core element is initially produced. The core element may be produced form any relevant material including plastics based materials, wood or metal or composite materials which materials are compatible with the materials of the fibre reinforced structural element meaning that the materials of the core element like all other materials used in accordance with the technique of the present invention are combinable with the remaining materials i.e. do not react with one another in a chemical process, and a mechanically combinable or linkable meaning that the materials may be joined together in an integral structure and preferably exhibit substantial identical mechanical characteristics as far as coefficients of expansion, and mechanical strength such as tear and shear strengths are concerned. In accordance with the presently preferred embodiment of the method according to the present invention, a pultruded core element is preferably used as is illustrated in FIG. 2.

Figure 2:
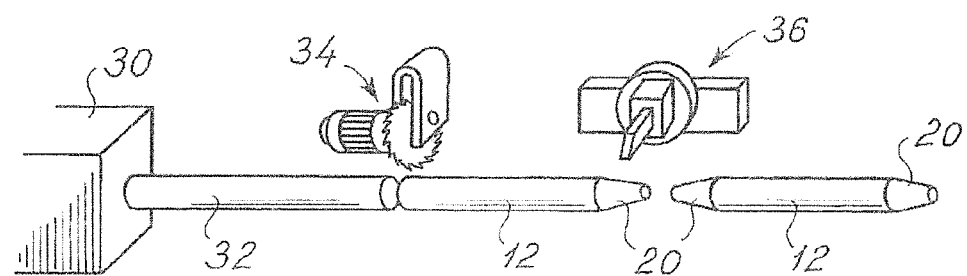
FIG. 2 is a schematic and perspective view illustrating a first step of a method of producing the assembly shown in FIG. 1 including machining a pultruded body into a plurality of core elements.

In FIG. 2, a pultruder is designated the reference numeral 30 in its entity and delivers from its output a pultrusion rod 32 i.e. a rod of circular cylindrical cross-sectional configuration made from resin such as a polyester, vinyl ester or phenol or epoxy resin in which reinforcing fibres such as glass fibre, carbon fibre or kevlar fibres are embedded. The pultrusion rod or body 32 is cut into individual core elements, one of which is designated by the reference numeral 12, by means of a cutter illustrated schematically as a saw 34. At opposite ends of the body or core element 12, conical end parts are produced by means of a machining device such as a cutter 36 illustrated schematically in FIG. 2. The cutter 36 produces the conical end parts designated by the reference numeral 20 at opposite ends of the core element 12.

Figure 3:
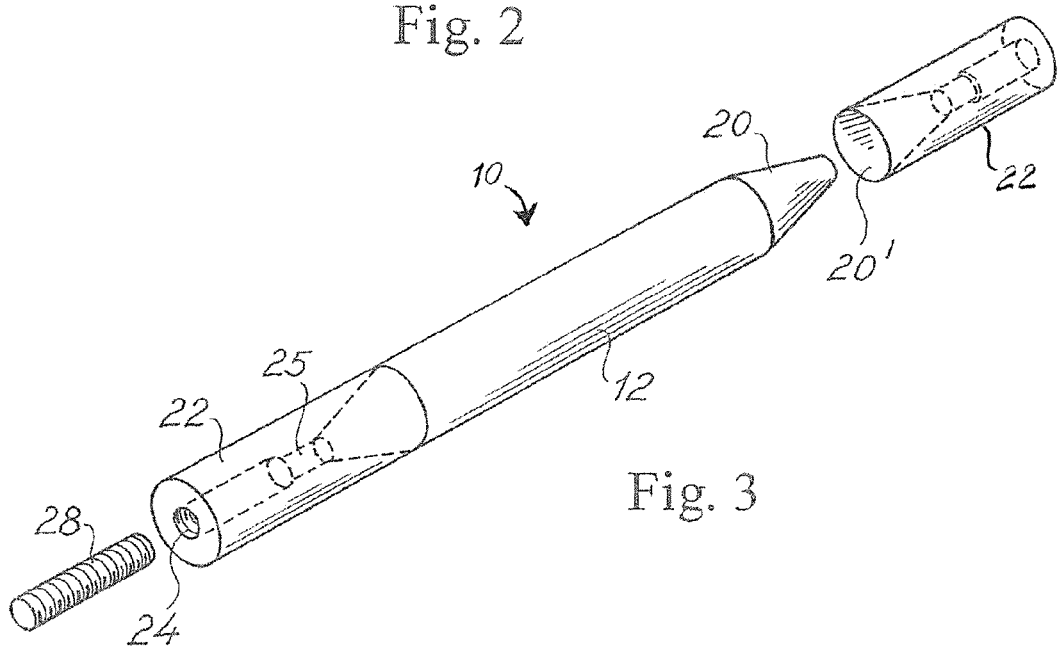
FIG. 3 is a schematic and perspective view illustrating a second step of the method of producing the assembly shown in FIG. 1 including mounting bolt fixtures at opposite ends of the core element produced in the step shown in FIG. 2.

In a further step of the method of producing the assembly 10 shown in FIG. 3, bolt fixtures 22 are positioned at opposite ends 20 of the core element 12 as is illustrated in FIG. 3.

Like the core element 12, the bolt fixtures 22 are preferably of a circular cylindrical cross-sectional configuration having at the one end a conical recess 20' configured in conformity with the conical end part 20 of the core element 12. Each of the bolt fixtures 22 is further provided with a through-going bore communicating with the conical recess 20' and defining a narrow central cylindrical bore part 25 and a wider threaded bore part 24 communicating with the exterior and intended to co-operate with a threaded shaft 28 as is illustrated in the lower left-hand part of FIG. 3. The bolt fixtures may be differently configured as the bolt fixtures may e.g. be of an overall conical configuration tapering from the one end towards the other end e.g. from the outer end towards the inner end or from the inner end towards the outer end. Alternatively, the bolt fixtures 22 may be provided with outwardly protruding flanges. Further alternatively, the bolt fixtures may have a differently configured through-going bore in which the threaded bore part 24 communicates with the conical recess without the intermediate narrow cylindrical bore part 25. Further alternatively, the threaded bore part 24 may be omitted as the bolt fixture may be provided as a fixture having an outwardly protruding threaded shaft constituting a bolt.

By the provision of the co-operating conical end part and the conical recess 20' of each of the bolt fixtures 22, a self-centering and self-aligning feature is obtained, as the bolt fixtures 22 due to the co-operation between the conical end part 20 and the conical recess 20', tend to be maintained in the intentional aligned orientation in which the circular cylindrical bolt fixtures 22 are constituting cylindrical continuations of the central part of the core element 12.

Figure 4:
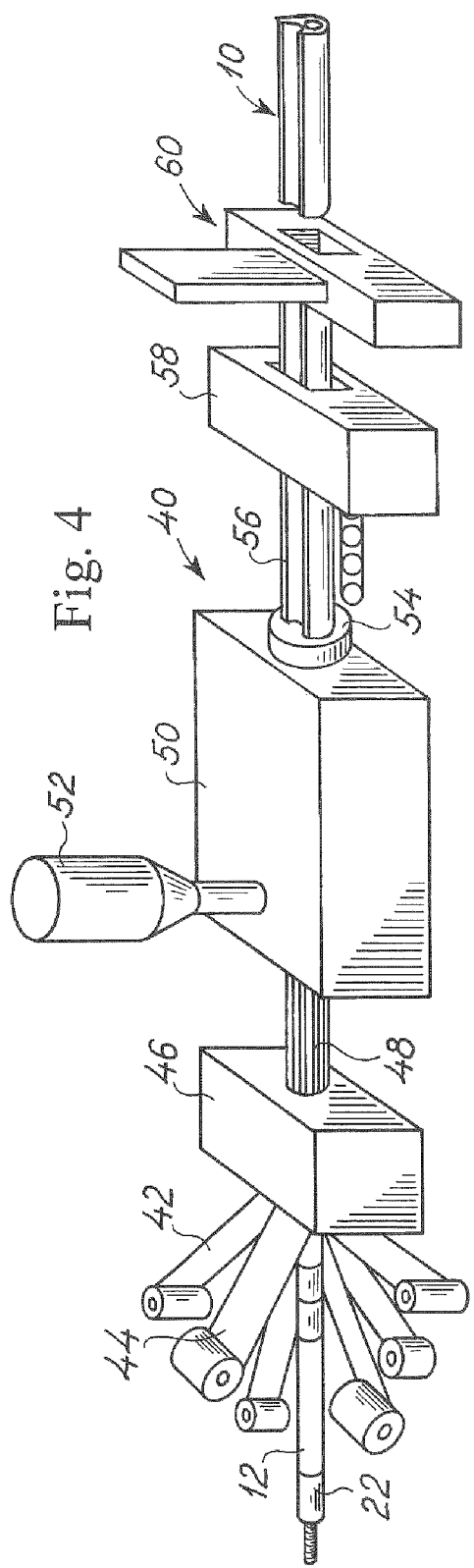
FIG. 4 is an overall perspective and schematic view illustrating a third step of the method of producing the assembly shown in FIG. 1 constituting a process of providing in a continuous pultrusion process a body from which the assembly shown in FIG. 1 is cut as is illustrated in the right-hand part of FIG. 4.

The subassembly comprising the core body and the two bolt fixtures 22 illustrated in FIG. 3 is, as is illustrated in FIG. 4, introduced into a pultrusion apparatus 40 comprising a receiving section 46 in which the subassembly described above along with a plurality of subassemblies together constituting a continuous string is introduced into the receiving section 46 of the pultrusion apparatus 40 together with webs of fibre reinforcing materials which webs are shown in the left-hand part of FIG. 4 and two of which are designated the reference numerals 42 and 44. From the receiving section 46, a string 48 including the aligned sub-assemblies circumferentially encircled by the fibre reinforcing materials is introduced into a resin applicator and resin heating and curing apparatus 50 communicating with a resin reservoir 52 for the supply of resin thereto. An output die of the apparatus 50 is designated the reference numeral 54 and provides a specific configured shaping of the of a pultrusion string 56 delivered from the die 54 apparatus 50 which string 56 is introduced into a puller apparatus 58 for pulling the pultrusion string from the die 54 of the apparatus 50.

Figure 1:
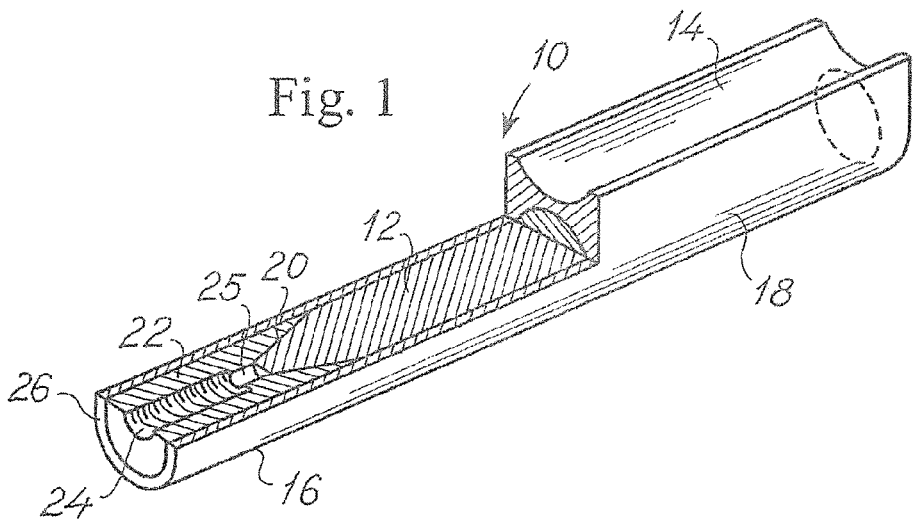
FIG. 1 is a partly sectional, perspective and schematic view of a first embodiment of an assembly from which two bolt fixture, bolt or fitting assemblies is produced.

From the puller 58, the string 56 is delivered to a cutter 60 which separates the string 56 into distinct sections constituting the assembly 10 also shown in FIG. 1 as the cutting of the string 56 in the sections or assemblies 10 is synchronised with the entry of the subassembly comprising the core body 12 provided with the end part covering bolt fixtures 22 to the entry end of the pultrusion apparatus 40.

In an alternative process of producing the subassembly from which the assembly 10 shown in FIG. 1 is produced, the bolt fixtures 22 and the core element 12 are fixated through adhesion to a cylindrical casing preferably produced through pultrusion and constituting the casing 26 described above. It is contemplated that the fixation through adhesion to the casing 26 produced through pultrusion and the technique of fixing the bolt fixtures 22 and the core element 12 to the casing through the pultrusion process constitute technical equivalencies.

In FIG. 1, the core element 12 is shown together with the bolt fixture 22 disclosing the threaded bore 24 communicating with the bore 25 and further disclosing the tapering or conical end part 20 of the core element 12.

In FIG. 1, the outer casing produced in the pultrusion process described above with reference to FIG. 4 is also disclosed, which casing is designated the reference numeral 26. FIG. 1 further discloses the configuration of the assembly 10 which configuration defines a concave top-surface 14, an opposite convex or circular cylindrical bottom surface 16 and opposing parallel planar surfaces 18. The convex/concave configuration illustrated in FIG. 1 allows, as will be described below with reference to FIGS. 7 and 10, the positioning of the bolt fixture assembly produced from the assembly 10 by arranging the convex outer surface 16 or one bolt fixture assembly juxtaposed and partly received within the concave surface 14 of the adjacent bolt fixture assembly.

Figure 5:
FIG. 5 is a schematic view illustrating a step of cutting the assembly shown in FIG. 1 and in the right-hand part of FIG. 4 into two bolt fixture assemblies.
Figure 6:
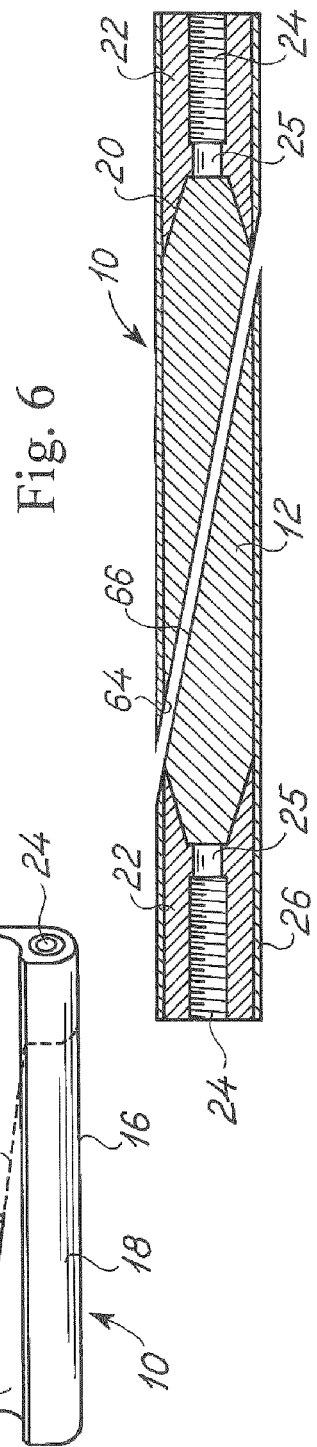
FIG. 6 is a vertical sectional view illustrating the assembly shown in FIG. 1 and the bolt fixture assemblies produced from the assembly as shown in FIG. 5.

From the assembly 10 shown in FIG. 1, two bolt fixture assemblies are produced as is illustrated in FIG. 5 by cutting the assembly 10 into two parts along a line indicated in dotted line by the reference numeral 64. The cutter is schematically illustrated by a saw 62. The assembly 10 cut into two halves is illustrated in FIG. 6 in a vertical sectional view disclosing the line of separation 64 providing opposite sloping surfaces 66 of each of the two bolt fixtures assemblies produced from the assembly 10. Each bolt fixture assembly constituting one half of the assembly 10 includes a tapering cut part of the core element 12 and the bolt fixture 22 fixated to the core element 12 by the pultrusion encasing 26. By provision of the sloping surface 66 an irregularly shaped bolt fixture assembly is produced enhancing the ability of fixation of the bolt fixture assembly within the final fibre reinforce structure and further providing a major surface of contact between the central core element 12 and the final fibre reinforced structure.

The ability of positioning the individual bolt fixture assemblies in an orientation different from a rectilinear orientation is illustrated in FIG. 7 as three individual bolt fixture assemblies combined into a structure in its entity designated the reference numeral 70 is shown and including three bolt fixture assemblies positioned having the concave surface 14 of one bolt fixture assembly receiving in the convex surface 16 of the adjacent bolt fixture assembly in an overall angular orientation. The fibre reinforced structure encasing the composite structure shown in FIG. 7 is designated the reference numeral 72.

In FIG. 8, a slightly modified configuration of the bolt fixture assembly is illustrated as the circular concave and convex surfaces 14 and 16 are substituted by concave and convex outer surfaces having planar generators. By the planar generator configuration of the convex surface 14' having a configuration corresponding to the configuration of the convex surface 16' of the blot fixture assemblies, the individual bolt fixture assemblies may, as is illustrated in FIG. 8, be combined into a structure in which the proper rectilinear positioning of individual bolt fixture assemblies is ensured and maintained by the provision of the corresponding convex and concave surfaces of the bolt fixture assemblies. The combination of a total of four bolt fixture assemblies in FIG. 8 is in its entirety designated the reference numeral 70'. From the composite structure illustrated in FIG. 8, a fibre reinforced structural element is produced in a further extrusion, pultrusion or manual or automated fibre reinforcing production process by the application of reinforcing fibres and resin to the combination of the fixture assemblies and configuring the structural element according to the intentional geometrical of the final product.

The final product is used e.g. as illustrated in FIG. 9 in connection with a load-bearing carrier I-beam 76 in which the bolt shafts 28 received within the bolt fixtures of the bolt fixture assemblies shown in FIG. 8 are fixated to the I-beam 76 by means of individual bolts 74.

The curved structure shown in FIG. 7 may alternatively be used for the fixation to e.g. a planar plate element 78 as illustrated in FIG. 10.

As mentioned above, the bolt fixtures 22 described above with reference to FIGS. 1-6 may advantageously be configured in a conical or elliptical shape for improving the fixation of the bolt fixtures within the pultrusion encasing 26. In FIGS. 11a-11c, different techniques of enhancing the fixation of the bolt fixtures within the pultrusion encasing are illustrated. Generally throughout the specification, components or elements identical to components or elements described previously are designated the same reference numerals as previously designated whereas components or elements geometrically differing from previously described components or elements, respectively, however serving the same purpose of previously described components or elements are designated the same reference integer, however added a marking for identifying the geometrical difference.

In FIG. 11a, the bolt fixture 22' differs from the above described bolt fixture 22 shown in FIG. 3 in that the outer surface of the bolt fixture 22' is of a rough or rugged structure providing an uneven outer surface which improves the fixation of the bolt fixture 22' to the pultrusion casing 26'. In FIG. 11a the rough or rugged outer surface of the bolt fixture 22' is for the sake of clarity somewhat exaggerated as compared to real life rough or rugged surfaces.

In FIG. 11b, a different technique of enhancing the fixation of the bolt fixture 22' relative to the pultrusion encasing 26'' is shown as the bolt fixture 22'' is provided with outer ridges defining a plurality of outer threads of left and right hand configuration serving the purpose of providing a solid embedding of the ridges within the polymer material of the outer pultrusion encasing 26''.

In FIG. 11c, a further alternative technique of improving the adhesion between the bolt fixture 22''' and the pultrusion encasing 26''' is shown. In FIG. 11c, the outer end of the bolt fixture 22''' is provided with an outer shallow thread 23''' in which reinforcing fibres and resin are received before the bolt fixture 22''' together with the core body 12''' are moved through the pultruder such as the pultruder further shown in FIG. 4.

In order to facilitate the cutting of the string from which the assemblies according to the present invention are cut such as the string 56 shown in FIG. 4, a distance body such as the body 80 shown in FIG. 12a may be used. Centrally the body 80 comprises centrally a circular cylindrical disc 82 from opposite sides of which two coaxially extending pins 84 protrude. The body 80 is generally used in combination with the bolt fixtures such as two bolt fixtures $22^{IV}$ shown in 12b for keeping the adjacent ends of the bolt fixtures $22^{IV}$ spaced apart and allowing the cutter to be easily moved through the outer pultrusion encasing, not shown in FIG. 12b, and through the distance body 80 which is preferably a pre-cast plastics body such as a PE, PP or similar plastics material body.

In FIG. 14a, a technique of using a carbon reinforced fitting in combination with a nut is shown. In FIG. 14a, a nut $22^V$ is encased within the pultrusion encasing $26^V$ at the outer end of the core body $12^V$. In registration with the nut $22^V$ a carbon fibre reinforced cylindrical bushing or fitting 27 is enclosed within the pultrusion encasing $26^V$ for allowing the nut $22^V$ to be kept spaced apart from the outer end of the assembly $10^V$ and at the same time through the provision of the carbon fibre reinforced bushing 27 providing a rigid assembly.

In FIG. 14b, a different technique of centring the bolt fixture relative to the core body is illustrated as the core body $12^{VI}$ is provided with an outer coaxially arranged pin $20^{VI}$ on which a bolt fixture or nut $22^{VI}$ is mounted.

Figure 13:
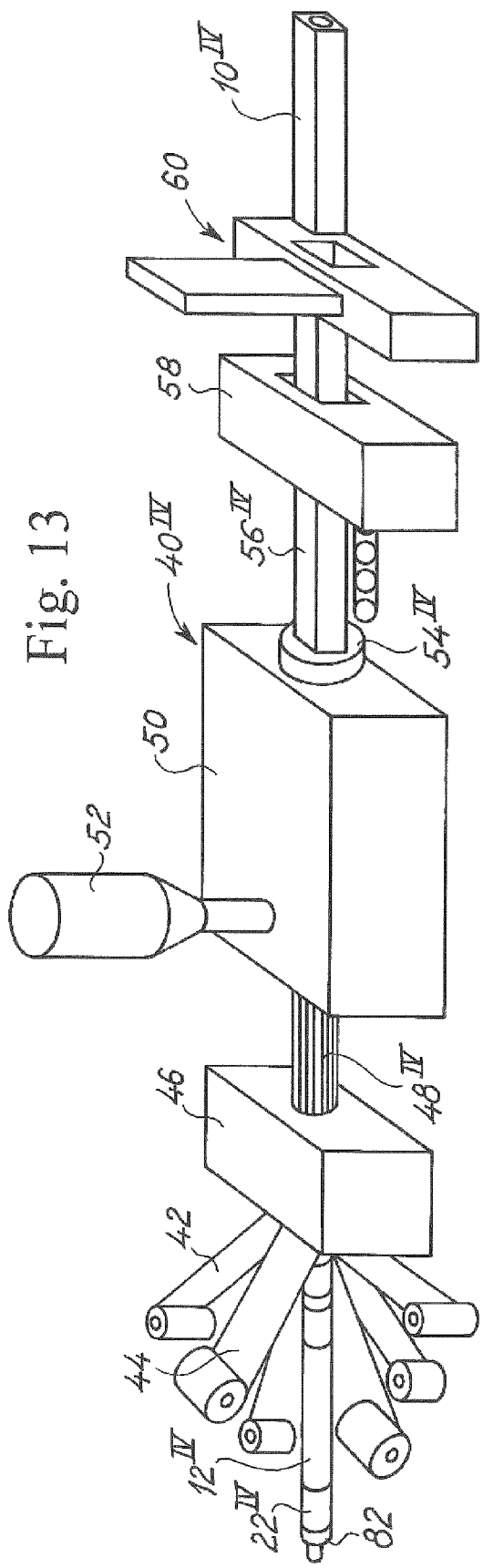
FIG. 13 is an overall perspective and schematic view similar to the view of FIG. 4 illustrating the method of producing a presently preferred assembly having a square cross-sectional configuration.

In FIG. 13, a pultrusion apparatus $40^{IV}$ is shown, basically corresponding to the pultrusion apparatus 40 described above with reference to FIG. 4, however differing from the above described apparatus in that in the receiving section 46, the string of core bodies $12^{IV}$ and bolt fixtures $22^{IV}$ further includes the distance bodies 42 for the production of the string $48^{IV}$ including the bolt fixtures $22^{IV}$ kept in spaced apart relationship by means of distance bodies 82.

From the curing apparatus 50, a string $56^{IV}$ is supplied having a square cross section or configuration as distinct from the above described configuration of the assembly 10.

The technique of providing a distance body 82 for the maintenance of the outer ends of the bolt fixtures $22^{IV}$ described above with reference to FIG. 12b may be amended for keeping the outer ends of the bolt pins received within the bolt fixtures in spaced apart relationship.

Figure 15:
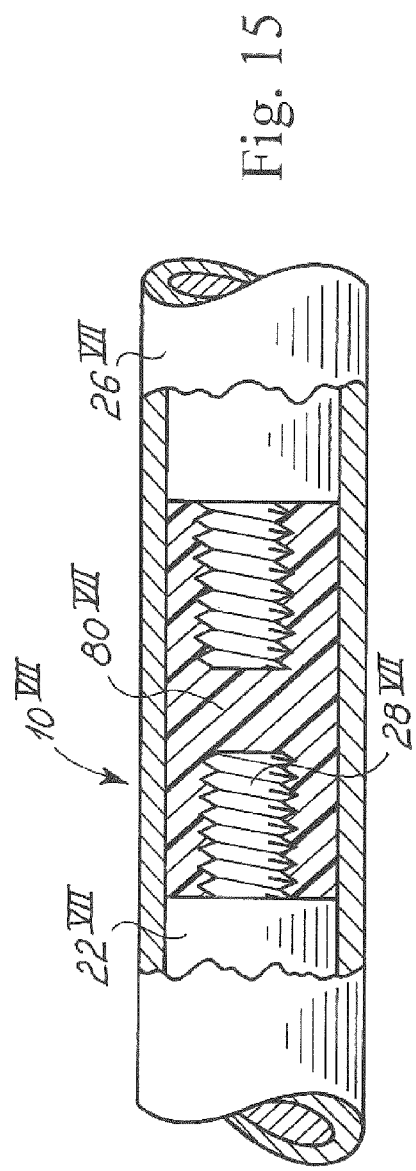
FIG. 15 is a perspective, schematic and partly sectional view of two adjacent parts of an assembly from which end parts two assemblies having protruding bolt pins are produced.

In FIG. 15, a pre-cast plastics material body $80^{VII}$ is provided constituting a circular cylindrical configuration having an outer diameter corresponding to the outer diameter of the bolt fixtures $22^{VII}$ and having threaded bores for the receiving of the outer ends of the bolt pins $28^{VII}$. After the finalising of the pultrusion process with the pultrusion apparatus such as the apparatus shown in FIG. 4 or alternatively in FIG. 13, the pultrusion string is cut e.g. by means of the cutter 60 as illustrated in FIGS. 4 and 13 as the cutter is moved into the spacing between the two outer ends of the bolt pins $28^{VII}$ received within the distance body $80^{VII}$.

Figure 16A:
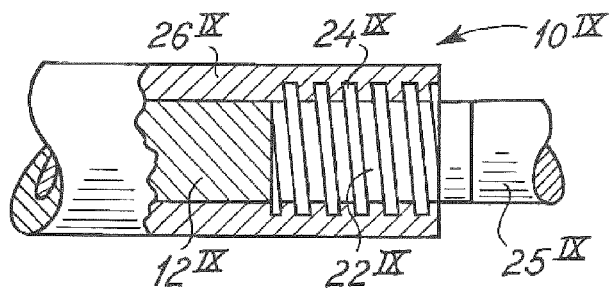
FIGS. 16a and 16b are perspective, schematic and partly sectional views similar to the view of FIG. 15 of a further embodiment of the assembly according to the present invention in which embodiment a fitting is embedded within the pultrusion encasing for the generation of an internal thread within the pultrusion casing.
Figure 16B:
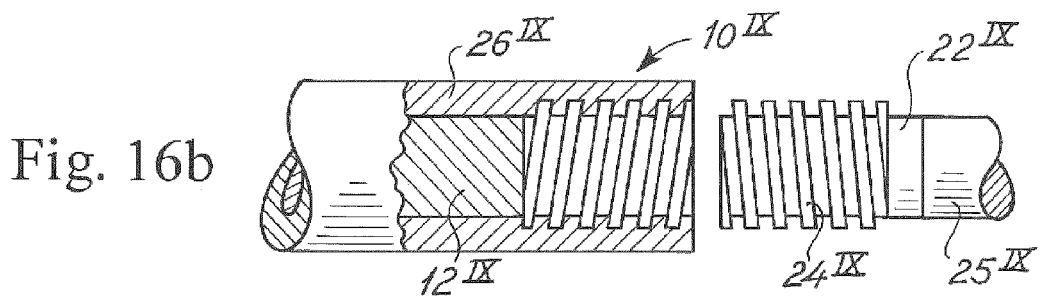

The integral pultrusion technique according to the present invention also allows the usage of the fitting integrally pultruded into the assembly according to the present invention to be used as a generator e.g. for the generation of an inner thread within the pultrusion encasing as is illustrated in FIGS. 16a and 16b.

In FIG. 16a, an end part of an assembly $10^{IX}$ according to the present invention is shown including a pultrusion encasing $26^{IX}$ in which a core body $12^{IX}$ is encased together with a generator body $22^{IX}$ which body is composed of a shaft $25^{IX}$ extending from the outer end of the assembly $10^{IX}$ and including a coarse thread $24^{IX}$ which is embedded within the pultrusion encasing $26^{IX}$. The outer surface of the thread $24^{IX}$ of the generator fitting $22^{IX}$ is provided with a slip coating such as a PTFE coating, a powder covering or a greasy surface coating allowing the generator fitting $22^{IX}$ to be removed from the outer end of the assembly $10^{IX}$ as is illustrated in FIG. 16b in which the generator fitting $22^{IX}$ is disengaged from the remaining part of the assembly $10^{IX}$, exposing the inner thread of the pultrusion encasing $26^{IX}$ originally generated by the external thread $24^{IX}$ of the generator fitting $22^{IX}$.

Figure 17:
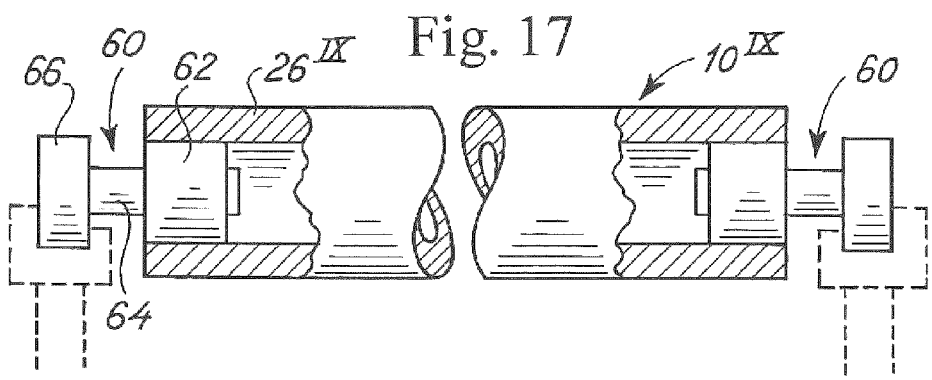
FIG. 17 is a perspective, schematic and partly sectional view of a further application of the assembly according to the present invention used as a roller of a roller belt.

The pultrusion encasing $26^{IX}$ may be used for receiving e.g. a part of a roller bearing such as a roller bearing 60 illustrated in FIG. 17 and received within the pultrusion encasing $26^{IX}$ of the assembly $10^{IX}$, e.g. by means of the threads shown in FIGS. 16a and 16b or alternatively fixated fixed relative to the inner wall of the pultrusion encasing $26^{IX}$ by means of an adhesive filling out the cavities of the inner thread of the pultrusion encasing $26^{IX}$ as originally generated by the generator fitting $22^{IX}$. The roller bearing 60 comprises a roller bearing part 62 fixated fixed to the outer end of the assembly $10^{IX}$ as already described and connected through a shaft 64 to a roller reel 66 supported on e.g. a stand or similar support. At the opposite end of the assembly $10^{IX}$ a similar roller bearing 60 is provided. The structure shown in FIG. 17 may e.g. be used for production plants in which a roller band is used and which roller band on the one hand may stand exposure to aggressive liquids or gasses and on the other hand may provide a light weight structure which is easily moved from one location to another.

Figure 18:
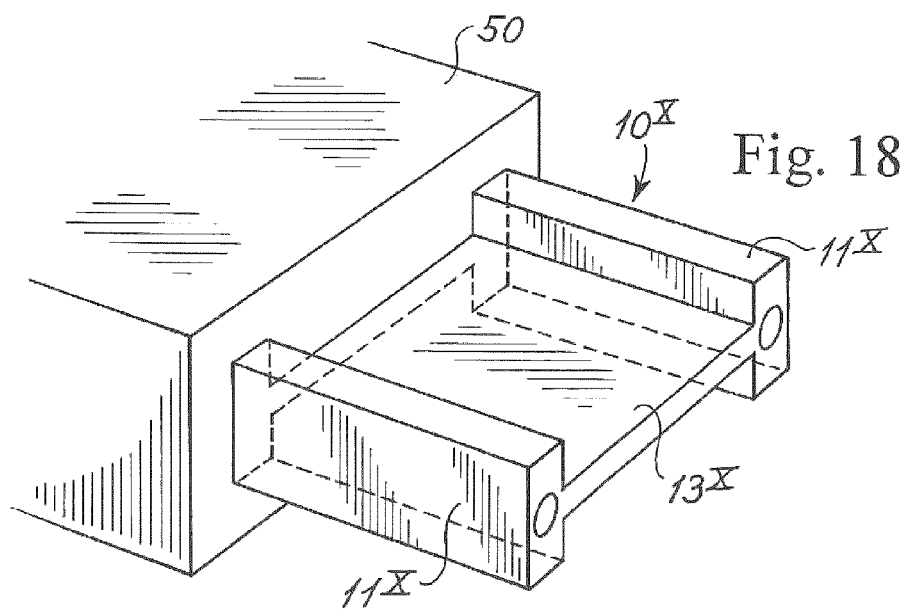
FIG. 18 is a schematic and perspective view of a differently configured assembly produced in accordance with the method as illustrated in FIG. 13 and shaped in an H-beam configuration.

The integral pultrusion production technique described above also allows the manufacture of elaborated configured structural elements such as an H-shaped structure element $10^X$ shown in FIG. 18 which is expelled from the curing apparatus 50 of a pultrusion apparatus similar to the apparatus described above with reference to FIGS. 4 and 13. In the H-shaped assembly shown in FIG. 18 two vertical bars are included each having integrally included bolt fixtures, bolts or fittings for allowing the H-shaped element to be fixed to another building structure. Each of the vertical bars of the assembly $10^X$ is designated the reference numeral $11^X$ and the horizontal web interconnecting the two vertical bars in the H configuration are designated the reference numeral $13^X$.

Figure 19:
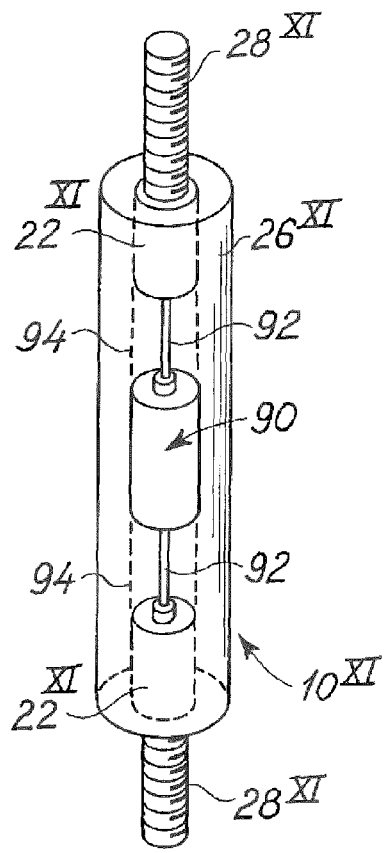
FIG. 19 is a perspective and schematic view illustrating the utilisation of the technique of producing a load-bearing assembly in accordance with the teachings of the present invention for use as a load sensor.
Figure 20:
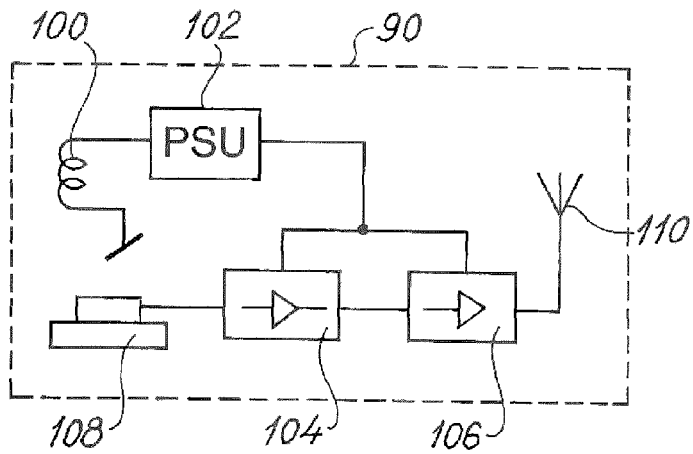
FIG. 20 is a diagram illustrating the electronics of the load sensor part of the assembly illustrated in FIG. 19.

The technique of providing a load-carrying assembly having fittings, bolt fixtures or bolts positioned at opposite ends for allowing the element or assembly to be used as a load-carrying element according to the teachings of the present invention may further be combined with the technique of measuring the load-carrying capability of the element by integrating a sensor such as a strain gauge or similar impact detecting sensor into the assembly according to the present invention. In FIG. 19, an assembly $10^{XI}$ is shown having two threaded pins $28^{XI}$ extending from opposite ends of a circular cylindrical pultrusion encasing $26^{XI}$. Within the pultrusion encasing $26^{XI}$ two bushings $22^{XI}$ are encased for receiving the threaded pins $28^{XI}$. Centrally within the pultrusion encasing $26^{XI}$, a load detector sensor unit 90 is received. The load detector sensor 90 may include a strain gauge or similar impact detecting element and may be implemented as is illustrated in FIG. 20. The load detector sensor unit 90 is connected by two pins 92 to the bushings $22^{XI}$ for the transmission of the load from the bushings $22^{XI}$ to the load detector unit 90. The load-transmitting pins 92 are each encased within a cylindrical encasing as is indicated in dotted line in FIG. 9 and designated the reference numeral 94.

The load detector sensor unit may be implemented as is illustrated in FIG. 20 included an induction loop 100 for receiving electrical power through induction from an external energising source, which induction loop is connected to a power supply unit 102 for the supply of electrical power to electronic circuitry blocks 104 and 106. The block 104 constitutes an input amp-stage receiving an input signal from a sensor element such as a strain gauge 108 and delivers on its output signal to a transmitter stage 106 which emits a radio wave signal to a remote receiver by means of an aerial 110. It is to be realised that the circuitry included in the load detector sensor unit 90 described above with reference to FIG. 20 may include any conventional signal shaping or signal conversion elements such as non-linear amplification stages, a/d converter stages etc. The technique of providing remote data locking units is well known in the art and no detailed description of the electronic circuitry of the load detector sensor element itself is being given as the implementation of the load detector sensor unit 90 itself is no part of the present invention.

Figure 21:
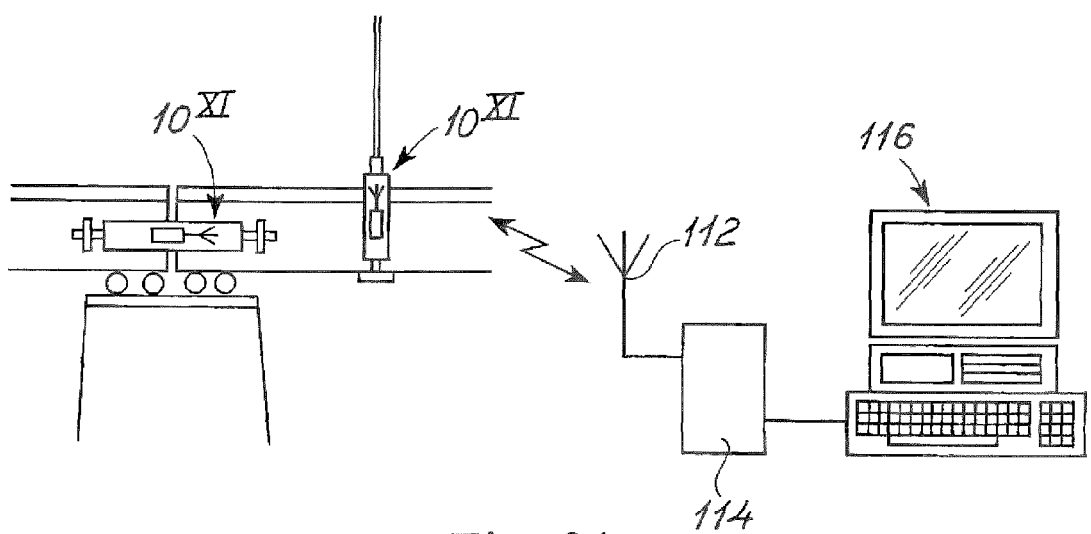
FIG. 21 is a schematic and diagrammatic view illustrating the use of the assembly shown in FIG. 19 as a load-bearing sensor within e.g. a bridge.

In FIG. 21, two different applications of the load detector sensor unit containing assembly $10^{XI}$ is illustrated. In FIG. 21, the one application of the assembly $10^{XI}$ is as a structural element for interconnecting two sections of a bridge and the alternative application comprises the use of the assembly $10^{XI}$ as a load-carrying element for supporting a wire of the carrying structure of the bridge. In FIG. 21, a receiver station for receiving data from the load detector sensor unit 90 (FIG. 20) is also illustrated comprising a receiver aerial 112 connected to a received stage 114 which deliver on its output an analogue or alternatively a digital signal to a measuring apparatus constituted by a PC designated the reference numeral 116.

In FIG. 22, the usage of a plurality of assemblies $10^{XI}$ is illustrated as in FIG. 22, a total of five assemblies $10^{XI}$ is used for the suspension of a bridge 120 from a wire 122. In FIG. 22, the data-logging is illustrated as a hard wire connection from each of the assemblies $10^{XI}$ to the data logging PC 116 having a total of five parallel inputs 114', as it is contemplated that the wireless transmission technique illustrated in FIG. 21 may readily be modified into a semi hard wire connection by the use of proximity detection technique by the use of a receiver unit positioned juxtaposed each of the assemblies $10^{XI}$ for receiving the data or the signals output from the load detector sensor unit and at the same time energising the unit 90 by the supply of energising current to the induction loop 100 of each of the units 90 included in the assemblies $10^{XI}$.

The high load-bearing capability of the assembly according to the present invention also allows the technique to be used for alternative applications such as in a high voltage insulator as is illustrated in FIG. 23 and FIG. 24. In FIG. 23, the assembly described above with reference to FIG. 19 is modified by the omission of the load detector sensor unit 90 and by the introduction of a high voltage insulator core body $12^{XII}$ constituted by a sealed hollow encasing in which a highly insulating gas such as $SF_6$ is included. The insulating core body $12^{XII}$ serve the same purpose as the above described core body 12 discussed with reference to FIGS. 1-6. In FIG. 23, the assembly $10^{XII}$ further comprises an outer pultrusion encasing $26^{XII}$ encasing the insulating core body $12^{XII}$ and further two insulating bushings $94^{XII}$ encircling and encasing the bushings $22^{XII}$ in which the threaded pins $18^{XII}$ are received and fixated fixed. In FIG. 23, three bell-shaped outer insulating elements $118^{XII}$ are further illustrated serving the purpose of preventing water or moisture from generating short-circuiting paths on the outer surface of the pultrusion encasing $26^{XII}$ as is well known in the art per se.

In FIG. 24, the intentionally an intended application of the high voltage insulator assembly $10^{XII}$ shown in FIG. 23 is illustrated as the high voltage insulating assembly $10^{XII}$ is suspended from a beam 124 for the support of a high voltage wire 126 which is suspended in and supported by a cross shaped fitting 128 which is fixated fixed to the outer end of one of the threaded pins $18^{XII}$ (FIG. 23) of the assembly $10^{XII}$.

FIG. 25A shows a perspective view and FIG. 25B a sectional view, respectively, of a further and presently preferred embodiment of a sub-assembly. The sub-assembly comprises an elongated core $12^{XIII}$ and two bolt fixtures $22^{XIII}$. The elongated core $12^{XIII}$ is in turn composed of an inner core 130 of a soft and light material such as balsa wood or a foamed core of e.g. polyurethane and a cover 132 of fibre reinforced material preferably produced by pultrusion, which is covering the inner core 130. The bolt fixtures $22^{XIII}$ are made of steel and positioned adjacent opposite ends of the elongated core element $12^{XIII}$. The ends of the elongated core $12^{XIII}$ have truncated conical shapes and are in turn divided into a central end face 134 exposing the inner core 130 and a circumferential end face 196 exposing the cover 132. A part of a further elongated core $12^{XIII}$ and a further bolt fixture $22^{XIII}$ is shown in the right-hand part of FIGS. 25A and 25B and separated from the right-hand end bolt fixture $22^{XIII}$ of the first-mentioned sub-assembly by a distance body or spacer 80'.

FIGS. 26A and 26B are views similar to the views of FIGS. 25A and 25B, respectively, illustrating the elements and components shown in FIGS. 25A and 25B, respectively, in an assembled state, in which the bolt fixtures $22^{XIII}$ are glued to the opposite ends of the elongated core element $12^{XIII}$ Also shown in connection with FIG. 26B is a zoomed section of the outermost radial interface defining the location of the highest stress 138. The location of the highest stress 138 is located at an interface between the cover 132 and the bolt fixture $22^{XIII}$, thereby two rigid materials, namely the fibre reinforced material and steel, transfer the forces and the soft inner core 130 is not involved.

Figure 28A:
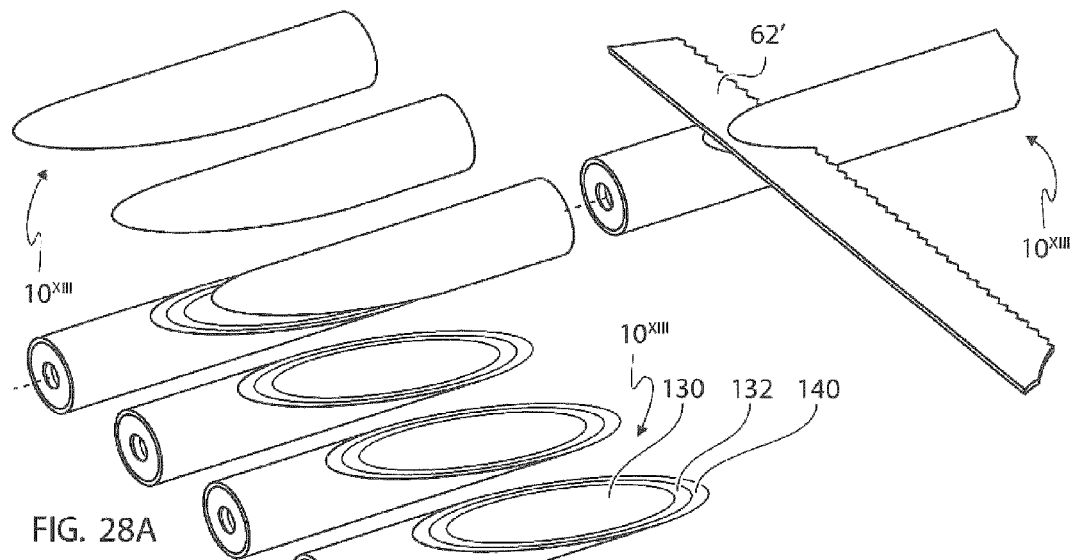
FIG. 28A is a perspective view of a bolt fixture assembly or bolt assembly shown in FIG. 27A after it has been cut as shown in FIG. 5.

FIG. 27A shows a perspective view and FIG. 27B a sectional view, respectively, of the final bolt fixture assembly $10^{XIII}$. The assembly $10^{XIII}$ has now been completely enclosed by a circular cylindrical casing 140 of fibre reinforced material. Thus, the location of the highest stress is now also completely enclosed by fibre reinforced material. Preferably, the pultrusion technique as shown above is used in order to produce a series of opposing bolt fixture assemblies $10^{XIII}$ FIG. 28A shows a perspective view and FIG. 28B a sectional view, respectively, of a set of a bolt fixture assembly $10^{XIII}$. The series of opposing bolt fixture assemblies $10^{XIII}$ has been separated from one another as shown in FIGS. 4 and 13 by cutting through the distance bodies or spacers for producing in a first step two opposing bolt fixture assemblies, and thereafter machined in an acute angle using a saw 62' thereby providing two separate assemblies 10', as shown in FIG. 5.

Figure 28B:
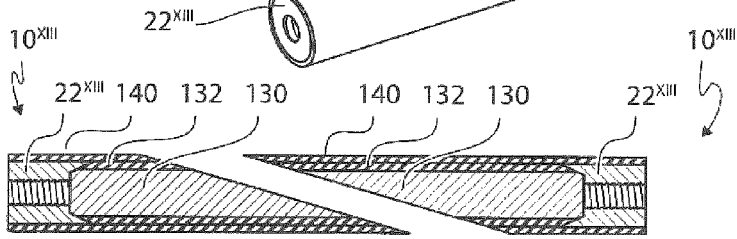
FIG. 28B is a vertical sectional view of the assembly of FIG. 28A.
Figure 29:
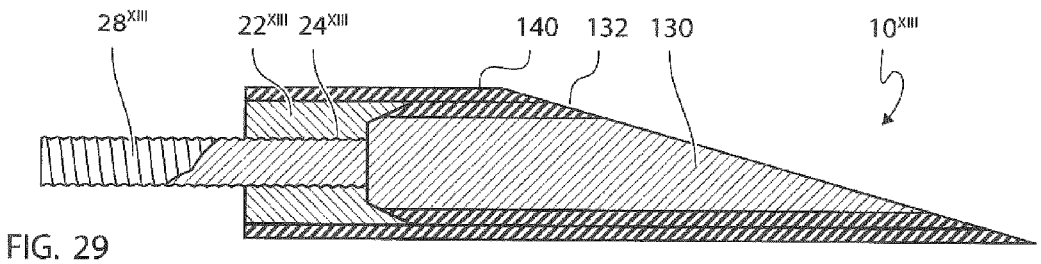
FIG. 29 is a vertical sectional view of the assembly shown in FIG. 28B in which a threaded rod is fixated.

FIG. 29 shows in an enlarged scale as compared to FIG. 28B the bolt fixture assembly $10^{XIII}$. It can be clearly seen that the circumferential outer surface of the bolt fixture $22^{XIII}$ is completely enclosed by the fibre reinforced material. The bolt fixture assembly $10^{XIII}$ has been provided with a threaded rod $28^{XIII}$ which has been introduced into the threaded bore $24^{XIII}$ of the bolt fixture $22^{XIII}$.

Figure 30:
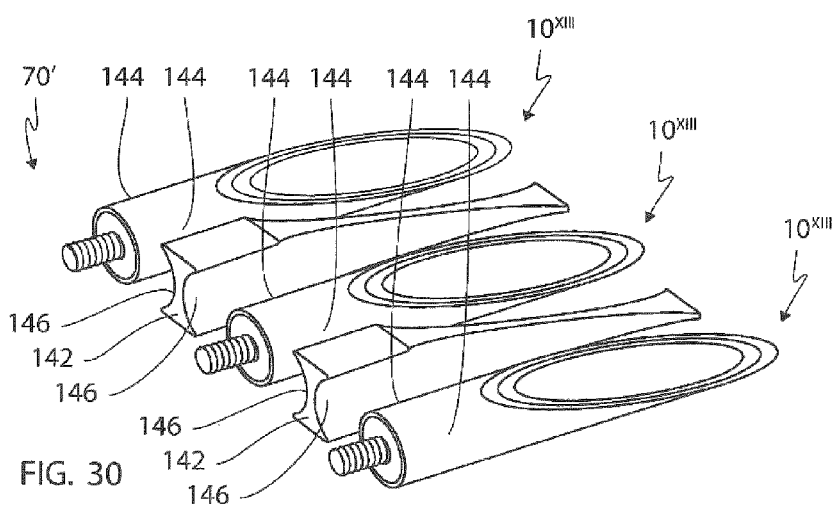
FIG. 30 is a perspective view of a fixation assembly including a plurality of bolt fixture assemblies and concave spacers.

FIG. 30 shows a perspective view of a fixation assembly 70'. The fixation assembly 70' includes a plurality of bolt fixture assemblies $10^{XIII}$, all designated the same reference numeral. In-between each bolt fixture assembly $10^{XIII}$, a spacer, all designated the reference numeral 142, is located. Each spacer 142 is adhered to a neighbouring bolt fixture assembly $10^{XIII}$ in a linear arrangement. Each bolt fixture assembly $10^{XIII}$ defines two oppositely located convex surfaces 144 and each spacer 142 defines two oppositely located concave surfaces 146 which correspond to and match the convex surfaces 144 in order to form close fit contact surfaces between the bolt fixture assemblies $10^{XIII}$ and the spacers 142. In the present case the convex surfaces 144 and the concave surfaces 146 define circular arcs.

Figure 31:
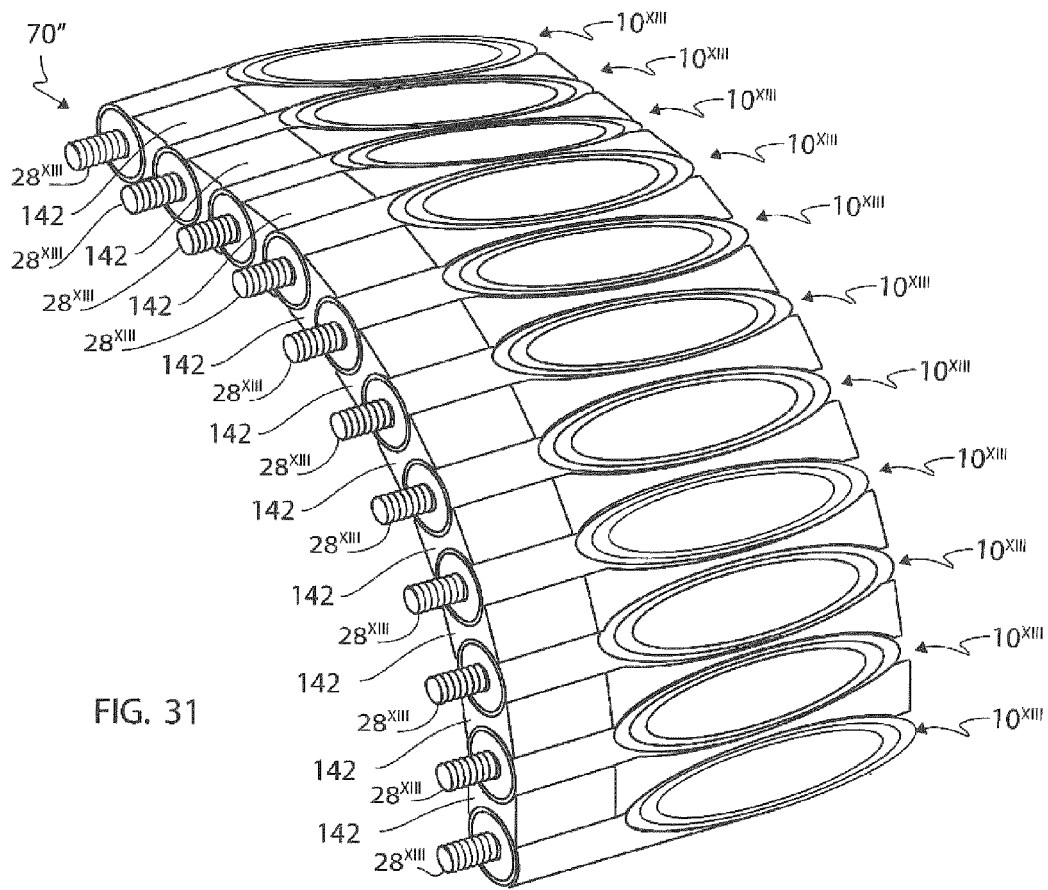
FIG. 31 is a perspective view of a curved fixation assembly including a plurality of bolt fixture assemblies and concave spacers.

FIG. 31 shows a perspective view of a curved fixation assembly 70". The spacers 142 have been rotated around the axis of the bolt fixture assemblies $10^{XIII}$ in order to generate the curvature and subsequently, the convex surfaces 144 have been adhered to the corresponding concave surfaces 146 using a compatible resin or glue.

Figure 32A:
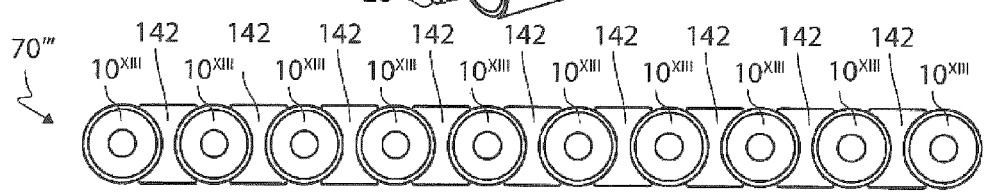
FIGS. 32A, 32B and 32C are top views of a curved fixation assembly, a straight fixation assembly and a box shaped fixation assembly, respectively.
Figure 32B:
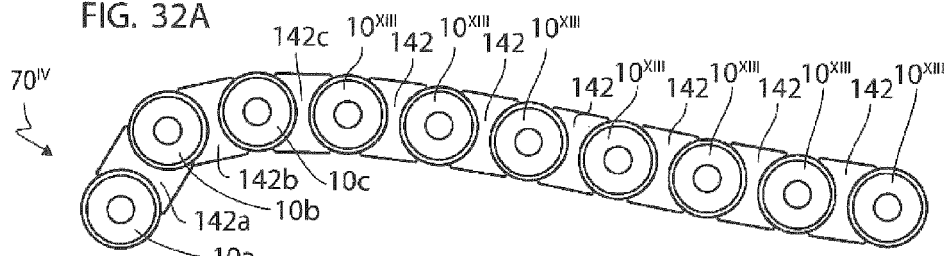

FIG. 32A shows a top view of a straight fixation assembly $70^{III}$. In order to form the present elongated linear fixation assembly $70^{III}$, the contact surfaces of the bolt fixture assemblies $10^{XIII}$ and the spacers 142 and the concave surfaces 146 (FIG. 30) should be facing one another, FIG. 32B shows a top view of a curved fixation assembly $70^{IV}$. The curved fixation assembly $70^{IV}$ resembles the fixation assembly 70" of FIG. 31 except that the first three bolt fixture assemblies 10a 10b 10c form a curve while the remaining bolt fixture assemblies $10^{XIII}$ define a straight line. In this configuration the contact surfaces between the respective three bolt fixture assemblies 10a 10b 10c and the corresponding spacers 142A 142B are not facing one another in order to form a bend or curve. Since the convex and concave surfaces match and constitute a cylindrical joint, it is contemplated that bends of between about 120 degrees and 180 degrees may be implemented using the bolt fixtures and spacers as illustrated. Using a smaller spacer will allow a smaller contact surface and thus a smaller angle such as 90 degrees to be implemented.

Figure 32C:
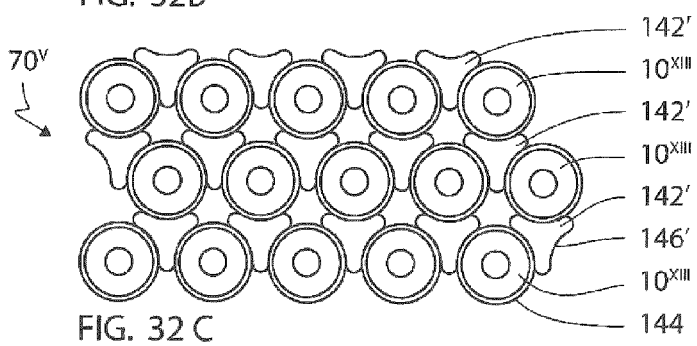

FIG. 32C shows a top view of a box shaped fixation assembly $70^{V}$. The box shaped fixation assembly $70^{V}$ include spacers $142^{I}$, which define three concave surfaces 146 defining a mutual angle of about 120 degrees. Each of the three concave surfaces 146 defines a contact surface against a convex surface of a neighbouring bolt fixture assembly $10^{XIII}$.

FIG. 33 shows a top view of a fixation assembly $70^{VI}$ including a plurality of dual bolt fixture assemblies $10^{XIV}$. The total bolt fixture assemblies $10^{XIV}$ are not entirely circular but define two oppositely located convex surfaces $146^{II}$ both defining circular arcs in the transversal direction. In-between each bolt fixture assembly $10^{XIV}$ is located a spacer 142. The dual bolt fixture assembly $10^{XIV}$ includes two bores $28^{XIV}$.

In the above context and with reference to FIGS. 30-33, the convex and concave surfaces preferably define a circular arc such that the contact surface defined between the bolt fixture and the spacer may slide along a circular path.

FIG. 34 shows a perspective view of a wind power plant 200. The wind power plant comprises a tower 202, a generator housing 204 on top of the tower 202, a rotating hub 206 connected to the housing 204 and three wings 208 fixated to the hub 206 at a mutual angle of 120 degrees.

FIG. 35 shows a zoomed perspective view of a wind power plant hub 206 and wings 208. The fixation assembly $70^{II}$ shown in FIG. 31 has been moulded into the wing 208 of the wind power plant 200 such that the bores of the bolt fixtures $22^{XIII}$ are exposed and the casings 140 of the bolt fixture assemblies $10^{XIII}$ are bonded to the compatible, fibre reinforced polymeric material of the wing 208. The wing 208 is subsequently bolted to the hub 206 by means of threaded rods $28^{XIII}$ which extend into the hub 206 and a securely fastened in the hub, e.g. by using suitable nuts 210. In an alternative application of the fixation technique described above, the technique is used for joining two parts of a larger wing together in an assembled wing structure.

In the present specification, the terms pultrusion and pultruding have been used covering the technique of providing and producing the core element and the subassembly. The terms pultrusion and pultruding, however, are to be construed broadly covering any combined technique of producing fibre reinforced products including techniques known as pullforming, pullwinding etc. Consequently, it is to be understood that any technique covered by the above terms or equivalent techniques comprising continuous, semi-continuous or intermittent production of elements, such as the core element and the subassembly are to be construed equivalences to the pultrusion technique described in the present specification.

Although the present invention has above been described with reference to specific, presently preferred embodiments, numerous modifications and amendments are obvious to a person having skill in the art and such modifications or amendments are to be considered part of the present invention without limiting the scope of the invention to the above described embodiments. Rather is the invention to be construed in the terms of the appending claims.

It is to be realised that the protective scope as defined in the appending claims does not cover the geometrical configuration of the assembly 10 shown in FIGS. 1-6 itself, namely the geometrical outer shape of the 'cedar plank' element whereas differently configured assemblies having specially configured outer surfaces such as the assemblies together constituting the structure shown in FIG. 8 are contemplated to be part of the protective scope as defined in the appending claims.

Points

1. A method of producing a fibre reinforced structural element including a plurality of bolt fixtures, bolts or fittings for the fixation of said structural element to another structural element, comprising the steps of:
   i) providing an elongated core element of a material, preferably fibre reinforcement material compatible with the materials of said fibre reinforced structural element, preferably made through pultrusion, having an end part for the mounting or fixation of one of said bolt fixtures, bolts or fittings,
   ii) mounting said one bolt fixture, bolt or fitting on said end part of said core element for producing a subassembly,
   iii) fixating said one bolt fixture, bolt or fitting relative to said end part of said core element in a pultrusion process by pulling said subassembly through a pultruder, by circumferentially covering said subassembly with reinforcing fibres and resin and by heating and curing said resin for causing said resin to provide in conjunction with said reinforcing fibres a casing circumferentially encircling said subassembly, or alternatively fixating said subassembly by adhesion to said encasing produced in a separate pultrusion process,
   iv) machining said subassembly circumferentially encircled within said casing of said reinforcing fibres and said cured resin for providing a bolt fixture, bolt assembly or fitting assembly including said core element and said one bolt fixture, bolt or fitting and said core element,
   v) repeating said steps i-iv for producing a plurality of said bolt fixtures, bolt assemblies or fitting assemblies,
   vi) positioning said plurality of assemblies according to the intentional position of said plurality of bolt fixtures, bolts or fittings within said final fibre reinforced structural element, and
   vii) producing said fibre reinforced structural element including said plurality of bolt fixtures, bolts or fittings constituted by said pluralities of assemblies in an extrusion, a pultrusion or a fibre reinforcing production technique.

2. The method according to point 1, said step i) of providing said elongated core element comprising the step of cutting said elongated core element from a continuous, elongated core element body.

3. The method according to any of the points 1 and 2, said elongated core element having respective end parts for receiving a respective bolt fixture, bolt or fitting at said respective end parts, said steps ii) and iii) comprising mounting and fixating two bolt fixtures, bolts or fittings at said respective end parts of said core element of said subassembly, and said step iv) comprising machining said subassembly circumferentially encircled within said casing of said reinforcing fibres and said cured resin into two halves each constituting a bolt fixture, bolt or fitting assembly.

4. The method according to any of the points 1-3, said step i) further comprising the step of machining said end part into a specific configuration for the receiving and centring of said bolt fixture, bolt or fitting having an end recess part congruent with said specific configuration of said end part of said core element.

5. The method according to any of the points 1-4, said casing being produced in step iii) having a specific cross-sectional configuration such as a circular, an elliptical, a polygonal, in particular a hexagonal or square cross-sectional configuration or alternatively a combination of the above mentioned cross-sectional configurations.

6. The method according to any of the points 1-5, said step iv) further comprising the step of machining said casing into a specific cross-sectional configuration such as a circular, an elliptical, a polygonal, in particular a hexagonal or square cross-sectional configuration or alternatively a combination of the above mentioned cross-sectional configurations.

7. The method according to any of the points 1-6, said step iv) comprising the step of providing said bolt fixture, bolt assembly or fitting assembly having an end surface part defining an acute angle relative to the longitudinal axis of said bolt fixture or bolt assembly.

8. A method of producing a bolt fixture, bolt assembly or fitting assembly for use in a fibre reinforced structural element including a plurality of bolt fixtures, bolts or fittings for the fixation of said structural element to another structural element, comprising the steps of:
   i) providing an elongated core element of a material, preferably fibre reinforcement material compatible with the materials of said fibre reinforced structural element, preferably made through pultrusion, having an end part for the mounting or fixation of one of said bolt fixtures, bolts or fittings,
   ii) mounting said one bolt fixture, bolt or fitting on said end part of said core element for producing a subassembly,
   iii) fixating said one bolt fixture, bolt or fitting relative to said end part of said core element in a pultrusion process by pulling said subassembly through a pultruder, by circumferentially covering said subassembly with reinforcing fibres and resin and by heating and curing said resin for causing said resin to provide in conjunction with said reinforcing fibres a casing circumferentially encircling said subassembly, or alternatively fixating said subassembly by adhesion to said encasing produced in a separate pultrusion process, and iv) machining said subassembly circumferentially encircled within said casing of said reinforcing fibres and said cured resin for providing a bolt fixture, bolt assembly or fitting assembly including said core element and said one bolt fixture, bolt or fitting and said core element.

9. The method according to point 8 of producing a bolt fixture, bolt assembly or fitting assembly further comprising any of the features of the method of producing a fibre reinforced structural element according to any of the points 2-7.

10. A fibre reinforced structural element including a plurality of bolt fixtures, bolts or fittings for the fixation of said structural element to another structural element, said fibre reinforced structural element being produced in accordance with the method according to any of the points 1-7 and including a plurality of bolt fixtures, bolt assemblies or fitting assemblies produced in accordance with the method according to any of the points 8 or 9.

11. A bolt fixture, bolt assembly or fitting assembly for use in a fibre reinforced structural element being produced in accordance with the method according to any of the points 8 or 9.

The invention claimed is:

1. A method of producing an assembly for use in a structural element made of a fibre-reinforced material, said method comprising the steps of:
   i) providing an elongated core element including an inner core of a first material, and a cover circumferentially encircling said inner core and made of a second material being a fibre-reinforced material compatible with the fibre-reinforced material of said structural element, said elongated core element having an end part that is at least partially conical in shape, said end part defining a central end face exposing said inner core and a circumferential end face encircling said central end face and exposing said cover;
   ii) providing a bolt fixture comprising an end recess having a shape conforming to the shape of said end part of said elongated core element;
   iii) producing a subassembly by receiving and centering said end part of said core element in said end recess of said bolt fixture so as to bring both said central end face and said circumferential end face into contact with said bolt fixture within said end recess;
   iv) fixing said bolt fixture to said end part of said core element in said subassembly by circumferentially covering said subassembly with a casing formed of cured fibre-reinforced resin circumferentially encircling said subassembly; and
   v) machining said subassembly circumferentially covered within said casing for providing said assembly including said elongated core element and said bolt fixture.

2. The method according to claim 1, wherein said end part defines an axial distance and a radial distance, said axial distance being larger than said radial distance.

3. The method according to claim 1, wherein said first material is at least one of softer and lighter than said second material, said first material being selected from the group consisting of balsa wood and foamed polymer material.

4. The method according to claim 1, wherein said step of fixing said bolt fixture to said end part of said core element is performed by pulling said subassembly through a pultruder, circumferentially covering said subassembly with reinforcing fibres and resin, and curing said resin to form said casing.

5. The method according to claim 1, wherein said step of fixing said bolt fixture to said end part of said core element is performed by adhering said subassembly to a casing that has been produced in a separate pultrusion process.

6. The method according to claim 1, wherein said step of providing said elongated core element comprises the step of cutting said elongated core element from a continuous, elongated core element body having a circular cross-sectional configuration.

7. The method according to claim 1, wherein said elongated core element has first and second respective end parts each configured for receiving a respective bolt fixture, wherein said steps ii) to iv) comprise mounting and fixing a bolt fixture at each of said first and second respective end parts of said elongated core element, and wherein said step v) comprises machining said subassembly circumferentially covered within said casing into two halves.

8. The method according to claim 1, wherein said casing has a cross-sectional shape selected from the group consisting of circular, square, polygonal, and elliptical.

9. The method according to claim 1, wherein said step v) further comprises the step of machining said casing into a circular or an elliptical cross-sectional configuration.

10. The method according to claim 1, wherein said bolt fixture has a corrugated outer surface.

11. A method of producing a fixation assembly for use in a structural element made of a fibre-reinforced material, said method comprising the steps of:
   i) providing an elongated core element comprising an inner core of a first material, and a cover circumferentially encircling the inner core and made of a second material that is a fibre-reinforced material compatible with the fibre-reinforced material of said structural element, said elongated core element having an end part configured for the mounting and fixation of a bolt fixture;
   ii) providing a bolt fixture for the fixation of said structural element to another structural element;
   iii) producing a subassembly by mounting said bolt fixture on said end part of said elongated core element;
   iv) fixing said bolt fixture to said end part of said core element in said subassembly by circumferentially covering said subassembly with a casing formed of cured fibre-reinforced resin circumferentially encircling said subassembly;
   v) producing a first assembly including said elongated core element and said bolt fixture by machining said subassembly circumferentially covered within said casing, said first assembly defining a first longitudinal axis and a first convex surface along the first longitudinal axis;
   vi) repeating said steps i-v for producing a second assembly defining a second longitudinal axis and convex surface along the second longitudinal axis;
   vii) producing a spacer of a material compatible with the fibre-reinforced material of said structural element, said spacer having a first concave surface corresponding to said first convex surface of said first assembly and a second concave surface corresponding to said second convex surface of said second assembly; and
   viii) producing a fixation assembly by positioning and adhering said spacer between said first assembly and said second assembly such that said first concave surface contacts said first convex surface and said second concave surface contacts said second convex surface.

12. The method according to claim 11, wherein said convex and concave surfaces define a circular arc.

13. The method according to 11, further comprising repeating said steps i-v for producing a third assembly defining a third longitudinal axis and a third convex surface along the third longitudinal axis, said spacer having a third concave surface corresponding to said third convex surface of said third assembly, said step viii) comprising contacting said third concave surface to said third convex surface, thereby providing said first, second and third assemblies in a triangular configuration within said fixation assembly.

14. The method according to claim 11, wherein said step of fixing said bolt fixture to said end part of said core element is performed by pulling said subassembly through a pultruder, circumferentially covering said subassembly with reinforcing fibres and resin, and curing said resin to form said casing.

15. The method according to claim 11, wherein said step of fixing said bolt fixture to said end part of said core element is performed by adhering said subassembly to a casing that has been produced in a separate pultrusion process.

16. The method according to claim 11, wherein said step of providing said elongated core element comprises the step of cutting said elongated core element from a continuous, elongated core element body having a circular cross-sectional configuration.

17. The method according to claim 11, wherein said elongated core element has first and second respective end parts each configured for receiving a respective bolt fixture, wherein said steps ii) to iv) comprise mounting and fixing a bolt fixture at each of said first and second respective end parts of said elongated core element, and wherein said step v) comprises machining said subassembly circumferentially covered within said casing into two halves.

18. The method according to claim 11, wherein said casing has a cross-sectional shape selected from the group consisting of circular, square, polygonal, and elliptical.

19. The method according to claim 11, wherein said step v) further comprises the step of machining said casing into a circular or an elliptical cross-sectional configuration.

20. The method according to claim 11, wherein said bolt fixture has a corrugated outer surface.

21. A method of producing a structural element made of a fibre-reinforced material and including a plurality of bolt fixtures for the fixation of said structural element to another structural element of fibre-reinforced material, said method comprising the steps of:
  i) producing a fixation assembly by a method comprising the steps of:
  (a) providing an elongated core element comprising an inner core of a first material, and a cover circumferentially encircling the inner core and made of a second material that is a fibre-reinforced material compatible with the fibre-reinforced material of said structural element, said elongated core element having an end part configured for the mounting and fixation of a bolt fixture;
  (b) providing a bolt fixture for the fixation of said structural element to another structural element;
  (c) producing a subassembly by mounting said bolt fixture on said end part of said elongated core element;
  (d) fixing said bolt fixture to said end part of said core element in said subassembly by circumferentially covering said subassembly with a casing formed of cured fibre-reinforced resin circumferentially encircling said subassembly;
  (e) producing a first assembly including said elongated core element and said bolt fixture by machining said subassembly circumferentially covered within said casing, said first assembly defining a first longitudinal axis and a first convex surface along the first longitudinal axis;
  (f) repeating said steps (a) through (e) for producing a second assembly defining a second longitudinal axis and convex surface along the second longitudinal axis;
  (g) producing a spacer of a material compatible with the fibre-reinforced material of said structural element, said spacer having a first concave surface corresponding to said first convex surface of said first assembly and a second concave surface corresponding to said second convex surface of said second assembly; and
  (h) producing a fixation assembly by positioning and adhering said spacer between said first assembly and said second assembly such that said first concave surface contacts said first convex surface and said second concave surface contacts said second convex surface;
  ii) positioning said fixation assembly according to an intended position of said fixation assembly within final structural element; and
  iii) producing said structural element including said fixation assembly in a process including one of extrusion, pultrusion, and a fibre-reinforcing technique.

* * * * *